United States Patent
Yen

(10) Patent No.: US 10,978,260 B2
(45) Date of Patent: Apr. 13, 2021

(54) BASE PLATE, KEY ASSEMBLY, ILLUMINATED KEY INPUT DEVICE AND MANUFACTURING METHOD OF BASE PLATE

(71) Applicants: LITE-ON ELECTRONICS (GUANGZHOU) LIMITED, Guangzhou (CN); Lite-On Technology Corporation, Taipei (TW)

(72) Inventor: Ming-Fu Yen, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/785,626

(22) Filed: Feb. 9, 2020

(65) Prior Publication Data
US 2020/0273642 A1 Aug. 27, 2020

Related U.S. Application Data

(60) Provisional application No. 62/808,818, filed on Feb. 21, 2019.

(30) Foreign Application Priority Data

Sep. 11, 2019 (CN) .......................... 201910858013.5

(51) Int. Cl.
| | | |
|---|---|---|
| H01H 13/14 | (2006.01) | |
| G06F 1/16 | (2006.01) | |
| H01H 3/12 | (2006.01) | |
| H01H 13/705 | (2006.01) | |
| H01H 13/83 | (2006.01) | |
| G06F 3/041 | (2006.01) | |
| G05G 1/10 | (2006.01) | |

(Continued)

(52) U.S. Cl.
CPC ............... *H01H 13/14* (2013.01); *G05G 1/10* (2013.01); *G06F 1/169* (2013.01); *G06F 1/1664* (2013.01); *G06F 3/0362* (2013.01); *G06F 3/03543* (2013.01); *G06F 3/041* (2013.01); *H01H 3/125* (2013.01); *H01H 13/705* (2013.01); *H01H 13/83* (2013.01); *G06F 1/1616* (2013.01); *G06F 2203/04103* (2013.01); *H01H 2217/01* (2013.01); *H01H 2219/03* (2013.01); *H01H 2219/036* (2013.01); *H01H 2221/07* (2013.01)

(58) Field of Classification Search
CPC ...... H01H 3/125; H01H 13/83; H01H 13/705; H01H 13/14; H01H 13/70; H01H 2221/062; H01H 2221/026; H01H 9/26; H01H 13/72; H01H 25/00; H01H 25/04; H01H 1/02
See application file for complete search history.

(56) References Cited

U.S. PATENT DOCUMENTS

2019/0244773 A1* 8/2019 Zou .................. H01H 3/125

* cited by examiner

*Primary Examiner* — Ahmed M Saeed
(74) *Attorney, Agent, or Firm* — JCIPRNET

(57) ABSTRACT

The disclosure provides a base plate adapted for disposing a support unit. The base plate includes a thermally sensitive material plate and a connecting member. The connecting member includes a junction part joined to the thermally sensitive material plate, and a connection part extending from the junction part. The connection part protrudes from a surface of the thermally sensitive material plate. A key assembly, an illuminated key input device, and a manufacturing method of the base plate are also provided.

24 Claims, 33 Drawing Sheets

(51) Int. Cl.
*G06F 3/0354* (2013.01)
*G06F 3/0362* (2013.01)

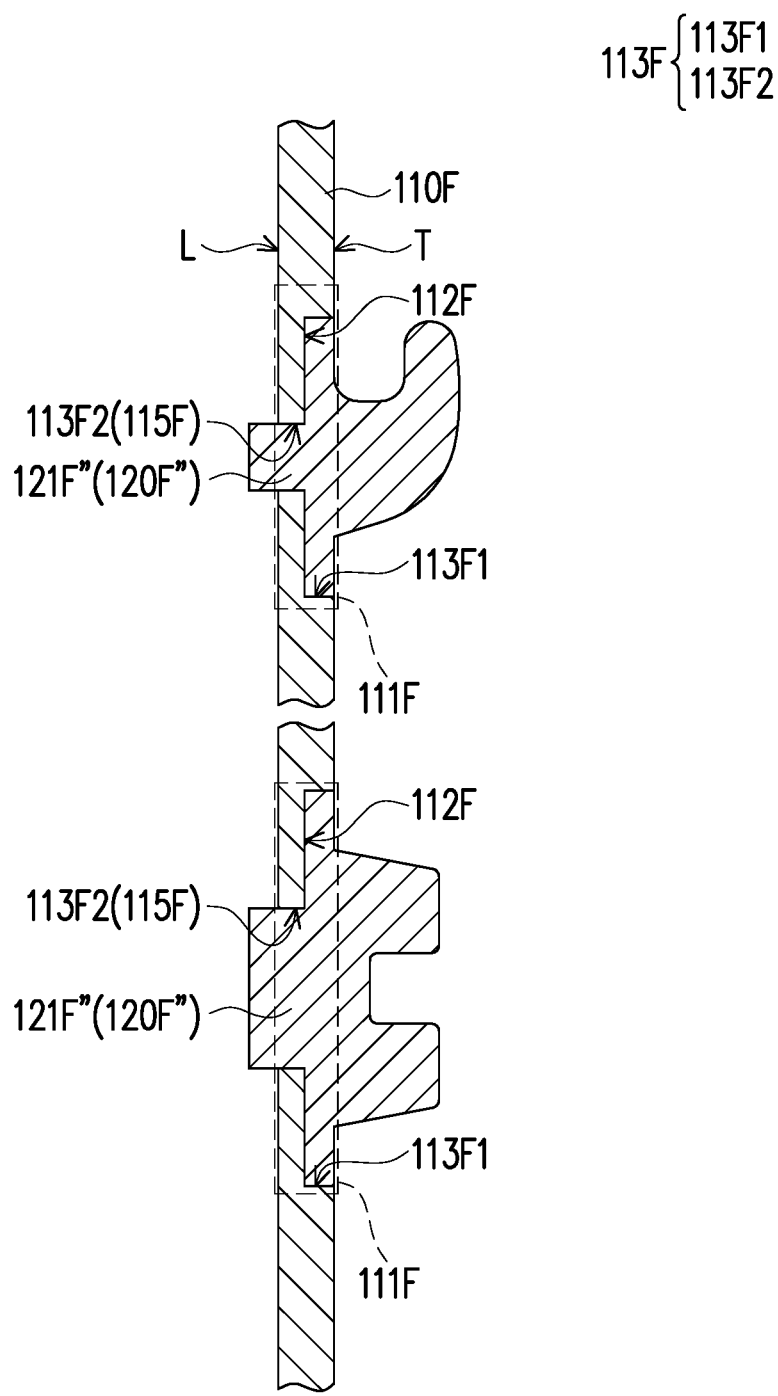
FIG. 3A"

BASE PLATE, KEY ASSEMBLY, ILLUMINATED KEY INPUT DEVICE AND MANUFACTURING METHOD OF BASE PLATE

CROSS-REFERENCE TO RELATED APPLICATION

This application claims the priority benefits of U.S. provisional application Ser. No. 62/808,818, filed on Feb. 21, 2019, and China application serial no. 201910858013.5, filed on Sep. 11, 2019. The entirety of each of the above-mentioned patent applications is hereby incorporated by reference herein and made a part of this specification.

BACKGROUND

1. Technical Field

The disclosure relates to an input device, and in particular to a lightweight base plate, a key assembly, an illuminated key input device and manufacturing method of the base plate.

2. Description of Related Art

With the development of the technology industry, electronic devices such as personal computers (PCs) and notebook computers (NBs) have become common appliances in our daily life, and keyboard has become an indispensable input tool. As the demand for lightweight design in the global electronics market continues to grow, the keyboard has also evolved to be lighter and thinner.

However, among the keyboard components, the keyboard metal base plate still accounts for a large proportion. Therefore, how to devise a thinner and lighter keyboard back plate for keys or keyboard products to meet the demand without compromising the structural strength of the keyboard back plate is an issue that needs to be addressed in the field.

SUMMARY

The disclosure is directed to a base plate that is lightweight and has rigidity similar to that of metal.

The disclosure provides a key assembly including the base plate.

The disclosure provides an illuminated key input device including the base plate.

A base plate of the disclosure is adapted for disposing a support unit. The base plate includes a thermally sensitive material plate and a connecting member. The connecting member includes a junction part joined to the thermally sensitive material plate, and a connection part extending from the junction part. The connecting member protrudes from a surface of the thermally sensitive material plate.

In an embodiment of the disclosure, the thermally sensitive material plate includes a first surface and a second surface opposite to the first surface, the connection part protrudes from the first surface and/or the second surface of the thermally sensitive material plate for connecting the support unit.

In an embodiment of the disclosure, the thermally sensitive material plate may be a thermoplastic fiber composite material plate, or a remodelable thermosetting plate material.

In an embodiment of the disclosure, a material of the connecting member is different from a material of the thermally sensitive material plate, and the thermally sensitive material plate includes a junction region, the junction part of the connecting member is joined to the junction region.

In an embodiment of the disclosure, the material of the connecting member is plastic and is integrally formed with the thermally sensitive material plate by injection molding.

In an embodiment of the disclosure, the junction region is surface-processed or surface-treated, and the junction part is bonded to the junction region.

In an embodiment of the disclosure, the thermally sensitive material plate includes a recess part recessed on the first surface or the second surface, and the junction part is filled in the recess part.

In an embodiment of the disclosure, the junction region includes a recess part recessed on the first surface or the second surface, and the junction part is filled in the recess part.

In an embodiment of the disclosure, the thermally sensitive material plate includes a through hole penetrating the first surface and the second surface, and the junction part is filled in the through hole.

In an embodiment of the disclosure, the thermally sensitive material plate includes a through hole communicating with the recess part to form a stepped through hole penetrating the first surface and the second surface, and the junction part is filled in the stepped through hole.

In an embodiment of the disclosure, the stepped through hole of the thermally sensitive material plate includes a first portion and a second portion, a hole diameter of the first portion or the second portion is larger than a hole diameter of the second portion or the first portion, and the junction part is filled in the stepped through hole.

In an embodiment of the disclosure, the thermally sensitive material plate includes a through hole and a protrusion structure protruding from the first surface or the second surface around the through hole, and the junction part is filled in the through hole.

In an embodiment of the disclosure, wherein the protrusion structure is formed a recess recessed on the second surface, the recess communicates with the through hole, and the junction part is filled in the through hole and the recess.

In an embodiment of the disclosure, wherein the thermally sensitive material plate comprises at least one slot located around the through hole, the at least one slot penetrates the first surface and the second surface, and the junction part is filled in the through hole and the at least one slot.

In an embodiment of the disclosure, the thermally sensitive material plate includes at least one slot located around the stepped through hole, the at least one slot penetrates the first surface and the second surface, and the junction part is filled in the stepped through hole and the at least one slot.

In an embodiment of the disclosure, the thermally sensitive material plate includes at least one slot located around the protrusion structure, the at least one slot penetrates the first surface and the second surface, and the junction part is filled in the through hole and the at least one slot.

In an embodiment of the disclosure, the protrusion structure includes at least one slot, the at least one slot communicates with the through hole, and the junction part passes through and is filled in the through hole and the at least one slot, thereby covering the protrusion structure.

In an embodiment of the disclosure, a bottom of the junction part is flush with the second surface, protrudes from the second surface, or part extends along the second surface.

In an embodiment of the disclosure, a bottom of the junction part protrudes from the second surface, protrudes from the second surface, or part extends along the second surface.

In an embodiment of the disclosure, the bottom of the junction part extends along the second surface, protrudes from the second surface, or part extends along the second surface.

A key assembly of the disclosure includes the above-described base plate, a keycap, and the support unit. The keycap is disposed on the base plate. The support unit is disposed between the keycap and the base plate, and a bottom end of the support unit is pivotally connected to the connecting member of the base plate.

An illuminated key input device of the disclosure includes a key assembly and a backlight module. The key assembly includes the above-described base plate. The base plate includes a hollow region. The backlight module is disposed under the base plate.

In an embodiment of the disclosure, the backlight module includes a reflective layer, a light-guiding layer, a light emitting unit, and a light-shielding layer. The light-guiding layer is disposed on the reflective layer. The light emitting unit is located beside the light-guiding layer. The light-shielding layer is disposed on the light-guiding layer. The light-shielding layer includes a transparent region. Light emitted by the light emitting unit is adapted to enter the light-guiding layer, pass through the transparent region of the light-shielding layer, and then exit toward the keycap through the hollow region of the base plate.

In an embodiment of the disclosure, the light-shielding layer includes a hole corresponding to the bottom portion of the connecting member, and the bottom portion of the connecting member is housed in the hole.

In an embodiment of the disclosure, the bottom of the connecting member abuts an upper surface of the light-shielding layer.

A manufacturing method of a base plate of the disclosure, including: providing a thermally sensitive material plate; heating and shaping a predetermined region of the thermally sensitive material plate; and forming a connecting member on the predetermined region of the thermally sensitive material plate, wherein the connecting member includes a junction part joined to the thermally sensitive material plate, and a connection part extending from the junction part, and the connection part of the connecting member protrudes from a surface of the thermally sensitive material plate.

In an embodiment of the disclosure, wherein the thermally sensitive material plate comprises a first surface and a second surface opposite to the first surface, the connection part protrudes from the first surface and/or the second surface of the thermally sensitive material plate.

In an embodiment of the disclosure, wherein the thermally sensitive material plate may be a thermoplastic fiber composite material plate, or a remodelable thermosetting plate material.

In an embodiment of the disclosure, the step of forming the connecting member on the thermally sensitive material plate further includes: punching the thermally sensitive material plate to define the connecting member, wherein a material of the thermally sensitive material plate is the same as a material of the connecting member; and heating a region between the thermally sensitive material plate and the connecting member to bend and form the connecting member so that the connecting member is substantially perpendicular to the first surface.

In an embodiment of the disclosure, the step of forming the connecting member on the thermally sensitive material plate further includes: disposing the thermally sensitive material plate in an accommodating space of a molding apparatus, wherein the molding apparatus further comprises a cavity corresponding to the predetermined region is provided for molding the connecting member; and injecting a molten injection material into the cavity, wherein the injection material is joined to a junction region of the thermally sensitive material plate to mold the connecting member on the junction region.

In an embodiment of the disclosure, the manufacturing method of the base plate further includes: forming a through hole in the junction region of the thermally sensitive material plate, wherein the through hole penetrates from the first surface to the second surface; and filling the injection material into the through hole and the cavity to mold the connecting member.

In an embodiment of the disclosure, the manufacturing method of the base plate further includes: heating the predetermined region of the thermally sensitive material plate and then forming a recess part recessed on the first surface and/or the second surface, wherein the junction region includes the recess part; and filling the injection material into the recess part of the thermally sensitive material plate and the cavity to mold the connecting member.

In an embodiment of the disclosure, the manufacturing method of the base plate further includes: forming a through hole, which corresponds to the recess part, on the junction region of the thermally sensitive material plate, wherein the recess part communicates with the through hole to form a stepped through hole; and filling the injection material into the stepped through hole and the cavity to mold the connecting member.

In an embodiment of the disclosure, the manufacturing method of the base plate further includes: surface-processing the junction region of the thermally sensitive material plate to form a roughened surface.

In an embodiment of the disclosure, the manufacturing method of the base plate further includes: forming at least one slot around the stepped through hole on the thermally sensitive material plate; and filling the injection material into the stepped through hole, the at least one slot, and the cavity to mold the connecting member.

In an embodiment of the disclosure, the manufacturing method of the base plate further includes: heating the predetermined region of the thermally sensitive material plate and then embossing to form a protrusion structure, wherein a recess is formed in the protrusion structure; forming a through hole on the protrusion structure, wherein the through hole communicates with the recess; and filling the injection material into the through hole, the recess, and the cavity to mold the connecting member.

In an embodiment of the disclosure, the manufacturing method of the base plate further includes: forming at least one slot around the protrusion structure on the thermally sensitive material plate; and filling the injection material into the through hole, the recess, the at least one slot, and the cavity to mold the connecting member.

In an embodiment of the disclosure, the manufacturing method of the base plate further includes: forming at least one slot on the protrusion structure, wherein the at least one slot communicates with the recess; and filling the injection material into the through hole, the at least one slot, the recess, and the cavity to mold the connecting member.

Based on the above, the design of the thermally sensitive material plate in the base plate of the disclosure reduces the overall weight. Therefore, when the base plate is applied to an electronic device, the overall weight of the electronic device is reduced without compromising the structural strength of the base plate so as to meet the demand for thinner and lighter electronic devices.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
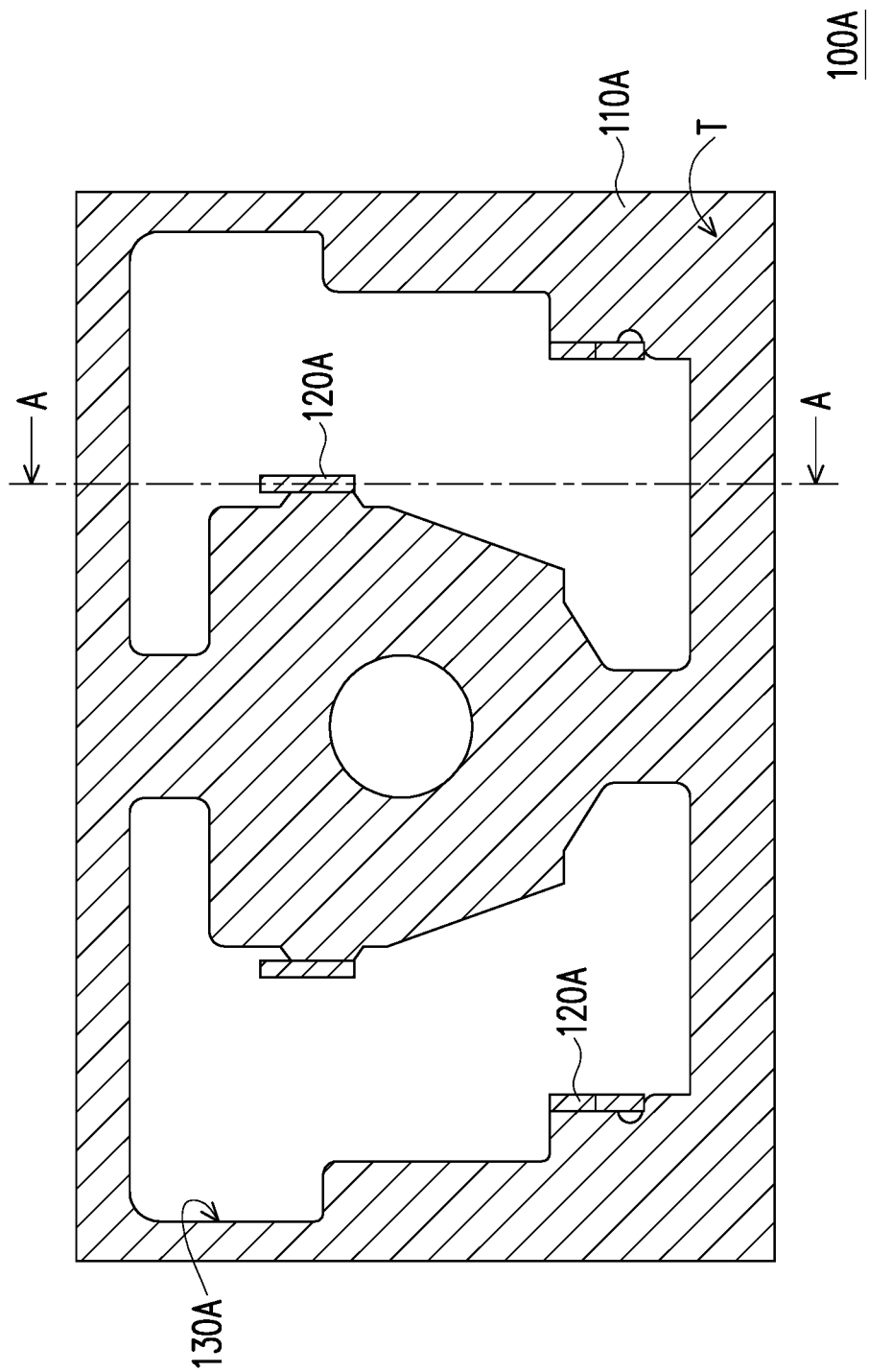
FIG. 1A is a schematic top view of a base plate according to an embodiment of the disclosure.

Several exemplary embodiments of a base plate of the disclosure, and several exemplary embodiments of an illuminated key input device, such as a keyboard, including the base plate of the disclosure will described in detail hereinafter. However, it should be understood that the concept of the disclosure may be applied in a wide variety of contexts, and the specific embodiments described herein are merely illustrative of the structures and applications of the disclosure and are not intended to limit the scope of the disclosure.

Reference will now be made to the exemplary embodiments of the disclosure. The same reference numerals will be used in the drawings and descriptions to refer to the same or similar parts where appropriate.

Figure 1B:
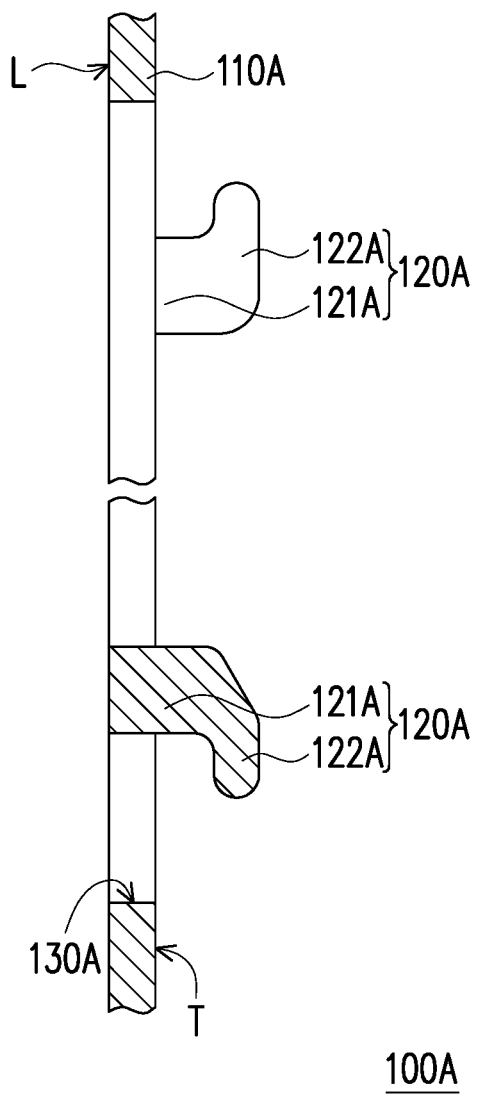
FIG. 1B is a schematic partial side view of the base plate of FIG. 1A.

FIG. 1A is a schematic top view of a base plate according to an embodiment of the disclosure. FIG. 1B is a schematic partial side view of the base plate of FIG. 1A. It should be noted that, in order to clearly show the detailed structure of the base plate, the base plate in FIG. 1A and FIG. 1B may not be drawn to scale. FIG. 1B is a cross-sectional view taken along the line A-A of FIG. 1A.

Referring to FIG. 1A and FIG. 1B, the base plate 100A of the present embodiment includes a thermally sensitive material plate 110A and a connecting member 120A. The thermally sensitive material plate 110A has a first surface T and a second surface L opposite to the first surface T. The connecting member 120A protrudes from the first surface T of the thermally sensitive material plate 110A. In the present embodiment, the first surface T is, for example, a top surface, and the second surface L is, for example, a bottom surface.

In the present embodiment, the connecting member 120A and the thermally sensitive material plate 110A are made of the same material and are integrally formed. The connecting member 120A is bent in the vertical direction from a plane where the thermally sensitive material plate 110A is located to stand on the first surface T.

In the present embodiment, the thermally sensitive material plate 110A may be a thermoplastic fiber composite material plate, a remodelable thermosetting plate material, or plastic. Preferably, the fiber composite material plate is continuous fiber reinforced thermoplastic composites (CFRTP), the fiber composite material is mainly composed of a continuous phase matrix and a reinforcement. Common reinforcements are, for example, glass fibers, Kevlar fibers, aramid fibers, carbon fibers, vegetable fibers or mixtures, and the matrix includes thermosetting and thermoplastic polymer materials. Thermosetting polymer materials include phenolic resins; phenol-formaldehyde resins; amine-formaldehyde resins, for example, melamine resins; urea-formaldehyde resins; polyester resins; urethane resins; epoxy resins; epoxy-polyester resins; acrylic resins; acrylic-urethane resins; fluorovinyl resins; cyanate ester resins; polyimide resins; unsaturated polyester and any other related high temperature thermosetting resin. Thermoplastic polymer materials include polypropylene (PP), polyethylene (PE), polycarbonate (PC), nylon, polyimide (PA), polyphenylene sulfide (PPS), and polyetheretherketone (PEEK), for example. However, the disclosure is not limited thereto. Materials having similar properties may be used in other embodiments.

Figure 9:
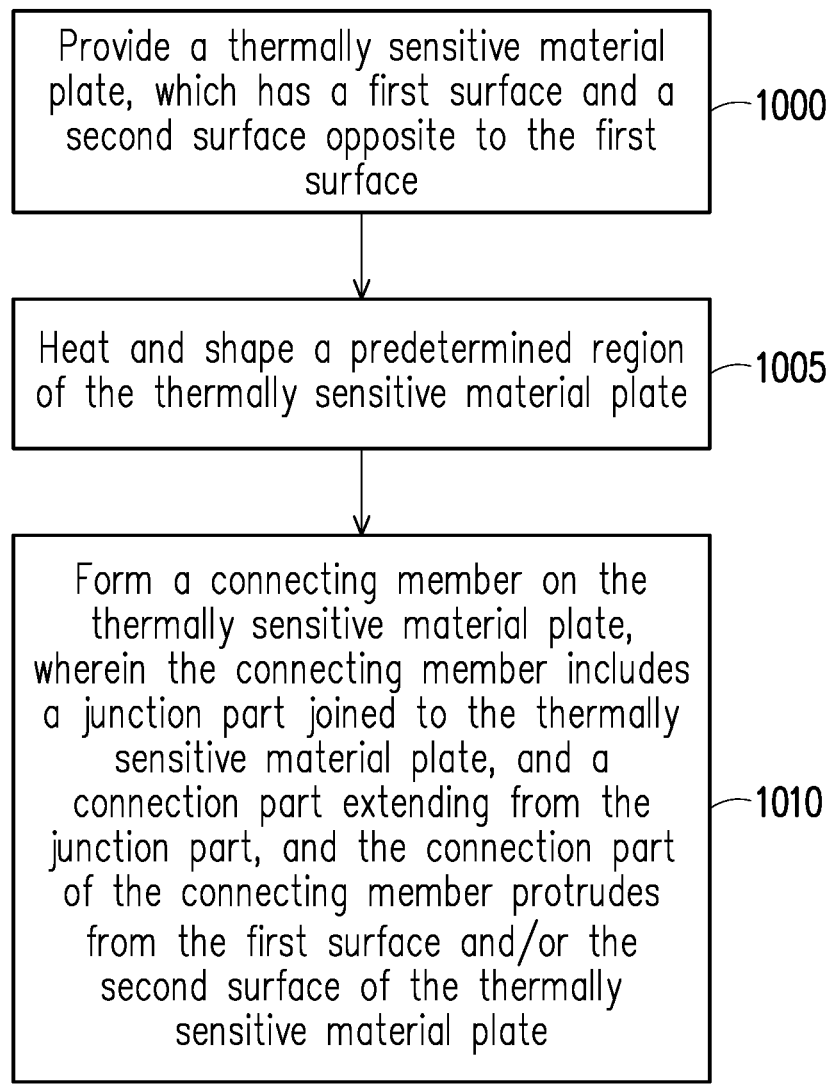
FIG. 9 is a flowchart showing a method of manufacturing the base plate of the disclosure.

In the present embodiment, first referring to FIG. 1B and FIG. 9, the process of manufacturing the base plate 100A is performed, for example, according to Step 1000, in which the thermally sensitive material plate 110A is provided. The thermally sensitive material plate 110A has the first surface T and the second surface L opposite to the first surface T. Further, according to Step 1005, a predetermined region of the thermally sensitive material plate 110A is heated and shaped. In addition, according to Step 1010, the connecting member 120A is formed on the predetermined region of the thermally sensitive material plate 110A, wherein the connecting member 120A has a junction part 121A joined to the thermally sensitive material plate 110A, and a connection part 122A extending from the junction part 121A. The connection part 122A of the connecting member 120A protrudes from the first surface T and/or the second surface L of the thermally sensitive material plate 110A.

To be more specific, first, the thermally sensitive material plate 110A is stamped (punched) and deburred to form the shape of the desired connecting member 120A and a plurality of openings, including a hollow region 130A (FIG. 1B). Next, in the predetermined region, for example, a region located between the thermally sensitive material plate 110A and the connecting member 120A is partially heated to bend the connecting member 120A so as to erect the connecting member 120A to be substantially perpendicular to the first surface T. Then, the thermally sensitive material plate 110A is cooled and solidifies, and thereby the manufacturing process is completed.

Here, the connecting member 120A may have a hook-shaped or U-shaped structure, for example, for the connecting member 120A and the support unit or other connected components to be pivotally connected to each other. The connecting member may even have a columnar structure in other embodiments. Nevertheless, the disclosure is not limited thereto.

Generally, the conventional base plate of keyboard is made of metal, for example, 304 stainless steel (SUS304). The density of SUS304 is about 7.93 g/cm$^3$. However, the density of carbon fiber is in a range of from about 1.53 g/cm$^3$ to 1.8 g/cm$^3$. It is experimentally confirmed that, when the thickness of a base plate made of SUS304 and the thickness of the base plate 110A made of carbon fiber are both about 0.3 mm, the weight of the base plate made of SUS304 is about 53.25 g, and the weight of the base plate 100A made of carbon fiber is about 13.04 g before it is stamped to form the shape of the connecting member 120A, which is much smaller than the conventional metal base plate.

In other words, the weight of the base plate 100A of the disclosure is reduced by about 70% to 80% compared to the weight of the conventional metal base plate. In addition, the base plate 100A of the disclosure has also passed the keycap pull-out test and has rigidity similar to that of metal so as to meet the user requirements.

Therefore, the weight of the base plate 100A of the disclosure is reduced because of use of the thermally sensitive material plate 110A. That is, when the base plate 100A of the disclosure is applied to an electronic device, the overall weight of the electronic device is reduced without compromising the structural strength of the base plate 100A so as to meet the demand for a thinner and lighter electronic device.

Figure 1C:
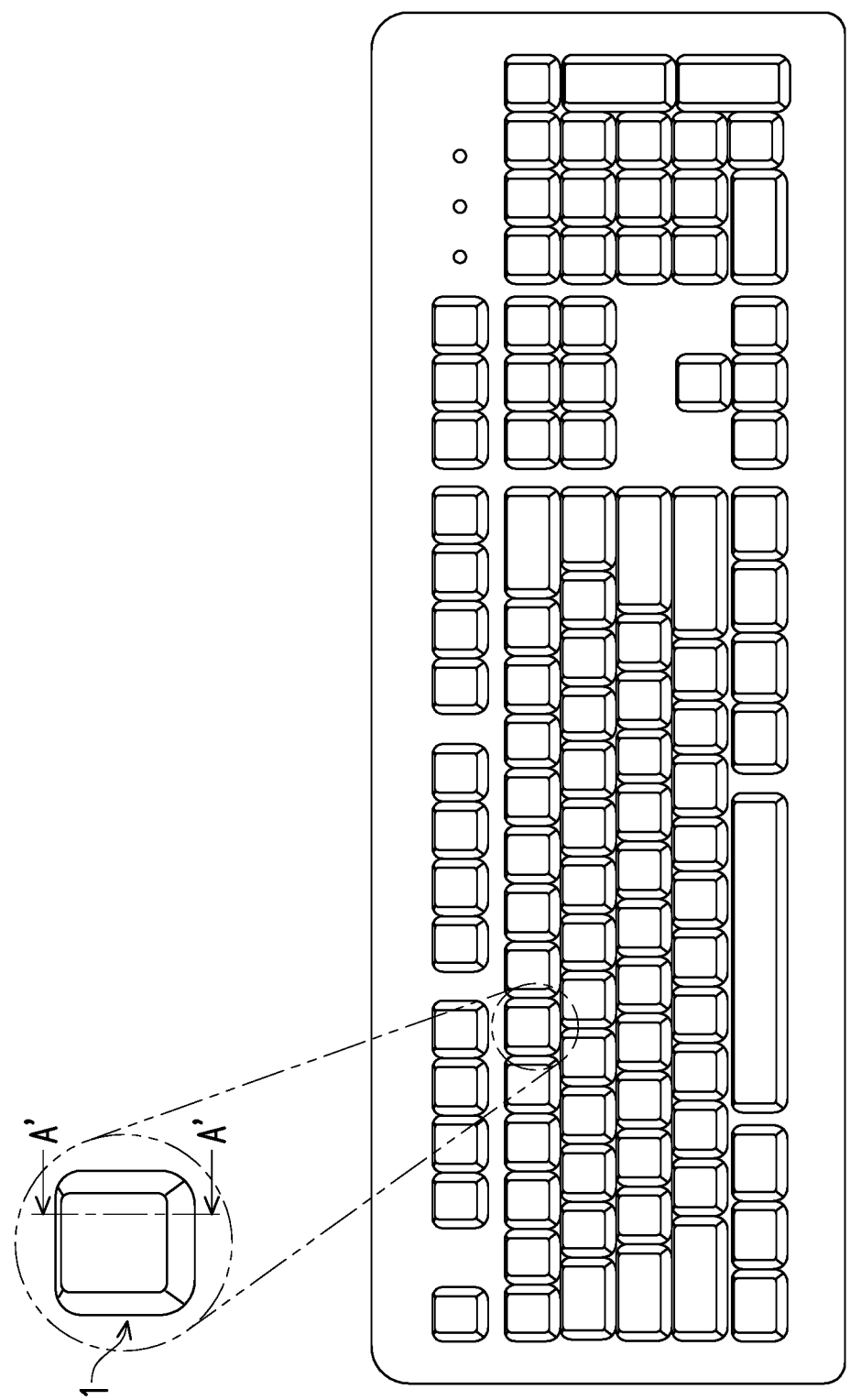
FIG. 1C is a schematic view of a key input device according to an embodiment of the disclosure.
Figure 1D:
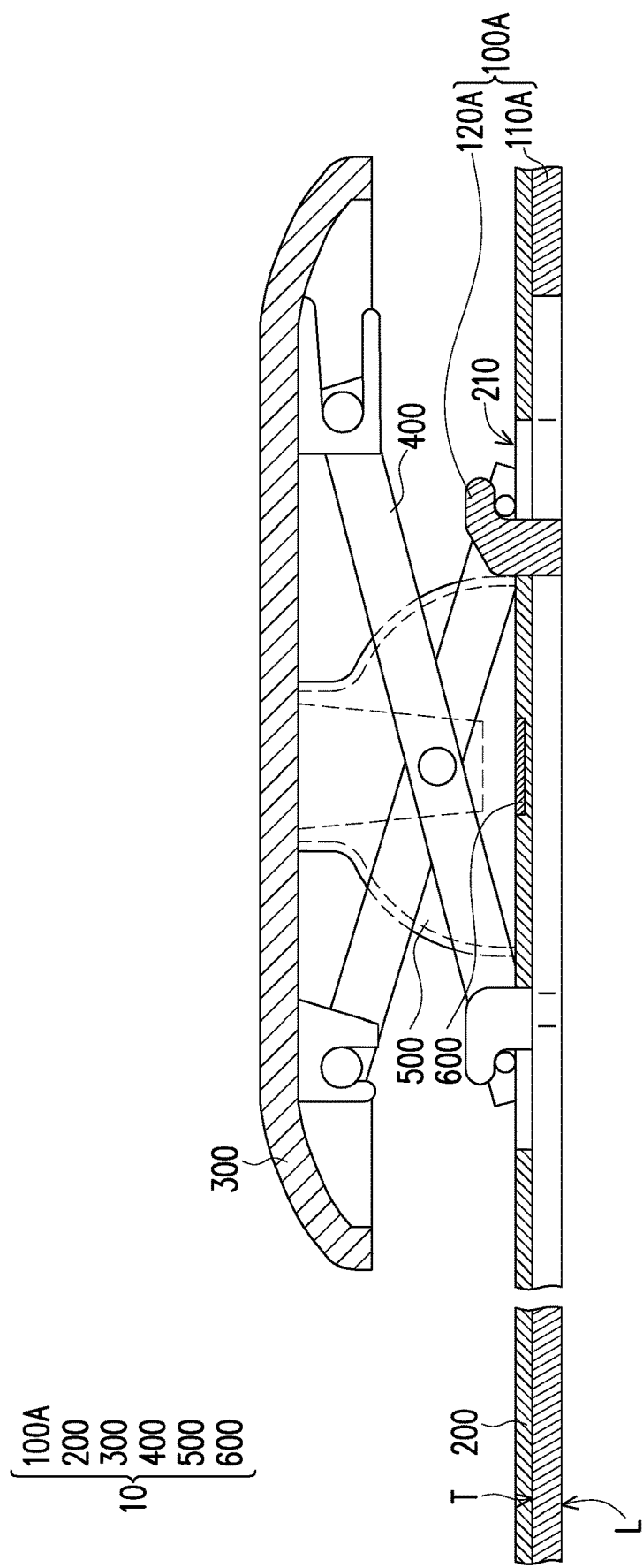
FIG. 1D is a schematic cross-sectional view of a partial region of FIG. 1C.
Figure 1E:
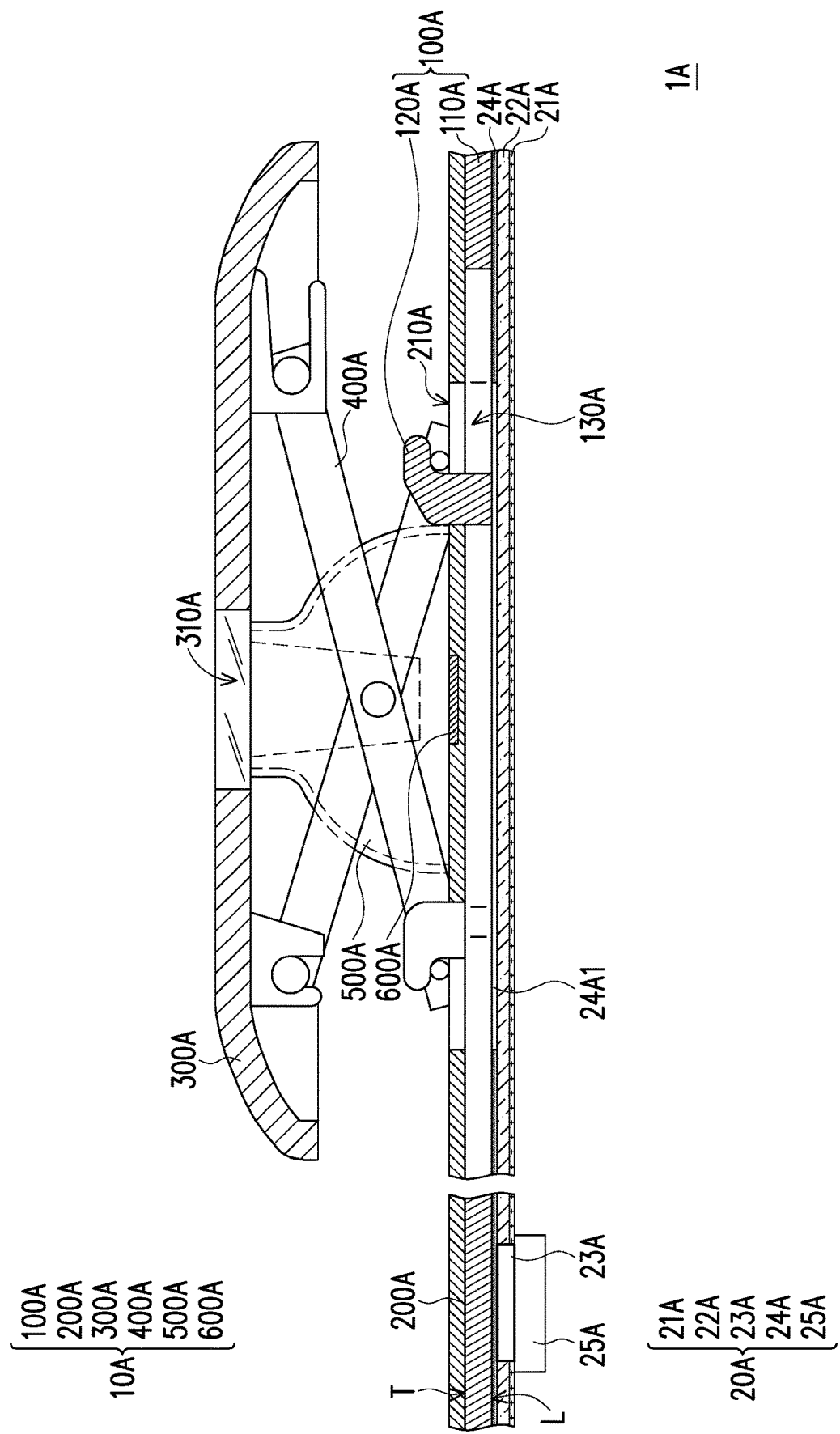
FIG. 1E is a schematic view of the base plate of FIG. 1A applied to an illuminated key input device.

FIG. 1C is a schematic top view of a key input device according to an embodiment of the disclosure. FIG. 1D is a schematic cross-sectional view of a partial region of FIG. 1C. FIG. 1E is a schematic view of the base plate of FIG. 1A applied to an illuminated key input device. It should be noted that, in order to clearly show the detailed structure of the base plate, the base plate, the key assembly, and the backlight module in FIG. 1C to FIG. 1E may not be drawn to scale.

First, referring to FIG. 1C, in an embodiment, the base plate 100A may be applied to a key input device 105, such as keyboard. The keyboard 105 includes a key switch structure 1. Please refer to FIG. 1D. FIG. 1D is a schematic cross-sectional view of the key switch structure 1 of FIG. 1C taken along the line A'-A'.

Specifically, the key switch structure 1 includes a key assembly 10. The key assembly 10 includes a keycap 300, a base plate 100A, and a support unit 400 disposed on the base plate 100A. The connecting member 120A of the base plate 100A pivotally connects the bottom end of the support unit 400. In the present embodiment, the connecting member 120A may be formed on a side of the thermally sensitive material plate 110A and arranged corresponding to the keycap 300, but the position of the connecting member 120A is not limited thereto. In FIG. 1D, the connecting member 120A is illustrated as a C-shaped clamp, for example, for pivotally connecting the key support unit 400.

In other embodiments, the connecting member 120A may have a hook-shaped or U-shaped structure or a fixing column (e.g., a post), but the disclosure is not limited thereto. In addition, although only one key switch structure 1 is illustrated in FIG. 1D, the key switch structure may also be key switch structures on other parts of the keyboard 105.

To be more specific, in the present embodiment, the key assembly 10 further includes a thin film circuit 200, such as membrane circuit disposed on the base plate 100A. In the present embodiment, the thin film circuit 200 has a plurality of openings 210. The openings 210 at least correspond to the connecting member 120A, and the connecting member 120A may protrude from a surface of the thin film circuit 200 through the openings 210.

The keycap 300 is disposed on the base plate 100A and the thin film circuit 200. That is, the thin film circuit 200 is disposed between the keycap 300 and the base plate 100A. The support unit 400 is disposed between the keycap 300 and the thin film circuit 200. The top end of the support unit 400 is pivotally connected to the keycap 300, and the bottom end of the support unit 400 is pivotally connected to the connecting member 120A.

The keycap 300 is coupled to the base plate 100A by the support unit 400, which allows the keycap 300 to move vertically with respect to the base plate 100A. More specifically, the support unit 400, such as a scissor-type mechanism for supporting the keycap 300, is disposed between the keycap 300 and the thin film circuit 200, which allows the keycap 300 to smoothly move up and down with respect to the base plate 100A. In the present embodiment, the support unit 400 includes a first bracket and a second bracket, wherein the first bracket is rotatably pivoted to the second bracket to form a scissor-type support unit, but the disclosure is not limited thereto.

In the present embodiment, the key assembly 10 further includes an elastic component 500 disposed on the thin film circuit 200. The elastic component 500 is disposed between the keycap 300 and the thin film circuit 200. When the keycap 300 is pressed, the elastic component 500 is compressed and deformed correspondingly to trigger a switch 600 on the thin film circuit 200. Therefore, the elastic component 500 is adapted for driving the keycap to trigger the switch and return.

In the present embodiment, the key assembly 10 that adopts the base plate 100A reduces the overall weight and still has sufficient structural strength.

Further, referring to FIG. 1E, in an embodiment, the base plate 100A may be applied to an illuminated key switch structure 1A for disposing a support unit 400A so as to be connected to a keycap 300A through the support unit 400A. Although FIG. 1E illustrates only one illuminated key switch structure 1A as an example, the number of the illuminated key switch structures 1A is not limited thereto, and the illuminated key switch structure 1A may be one of the key switch structures of an illuminated keyboard (That is, illuminated key input device).

To be more specific, the illuminated key switch structure 1A includes a key assembly 10A and a backlight module 20A. The base plate 100A may be a substrate of the key assembly 10A. The base plate 100A is disposed on the backlight module 20A.

In the present embodiment, the base plate 100A has a hollow region 130A that allows the light emitted by the backlight module 20A to pass through, but the form of the base plate 100A is not limited thereto. In the present embodiment, the keycap 300A is provided with, for example, a transparent character region 310A for the light emitted by the backlight module 20A to pass through, so as to serve as an illuminated key switch.

It should be noted that, in other embodiments, the base plate 100A may be provided with a circuit in place of the thin film circuit 200A, and the illuminated key switch structure 1A may include a light emitting element under each keycap 300A on the circuit board in place of the backlight module 20A.

In the present embodiment, the backlight module 20A includes a reflective layer 21A, a light-guiding layer 22A, a light emitting unit 23A, and a light-shielding layer 24A, wherein the light-guiding layer 22A is disposed between the reflective layer 21A and the light-shielding layer 24A. In the present embodiment, the light emitting unit 23A is, for example, a side-view LED or a top-view LED. The light emitting unit 23A may be located on at least one side of the light-guiding layer 22A, disposed underneath the keycap 300A, or located on the thin film circuit 200A corresponding to the keycap 300A, but not limited thereto.

As shown in FIG. 1E, in the present embodiment, the light emitting unit 23A is located beside the light-guiding layer 22A or embedded in the light-guiding layer 22A. The light-shielding layer 24A is disposed on the light-guiding layer 22A. The light-shielding layer 24A includes a transparent region 24A1. The light emitted by the light emitting unit 23A is adapted to enter the light-guiding layer 22A, pass through the transparent region 24A1 of the light-shielding layer 24A, and then exit in the direction of the keycap 300A through the hollow region 130A of the base plate 100A (FIG. 1B) and the opening 210A of the thin film circuit 200A. In addition, as shown in FIG. 1E, in the present embodiment, the base plate 100A is disposed on the light-shielding layer 24A, which may be connected to the base plate 100A by conventional joining means such as positioning column and glue.

In the present embodiment, the backlight module 20A further includes a flexible circuit board 25A. The flexible circuit board 25A is located under the reflective layer 21A, and the light emitting unit 23A can be disposed on the flexible circuit board 25A and passes through the reflective layer 21A and extends to be beside the light-guiding layer 22A. The light emitting unit 23A is coupled to a power supply through the flexible circuit board 25A for the power supply to supply power to the light emitting unit 23A. In other embodiments, if the wiring of the light emitting unit 23A is disposed on the reflective layer 21A, the light-guiding layer 22A, or the light-shielding layer 24A, the flexible circuit board 25A may be omitted. Nevertheless, the disclosure is not limited thereto. The backlight module is sufficiently known by those skilled in the art and is not described in detail herein.

Since the illuminated key switch structure 1A of the present embodiment adopts the base plate 100A, the overall weight is reduced without compromising the structural strength of the base plate 100A so as to meet the demand for a thinner and lighter illuminated key input device.

Some other embodiments are provided below for illustration. It should be noted that the reference numerals and some descriptions of the foregoing embodiments also apply to the following embodiments. The same reference numerals will be used to refer to the same or similar components, and thus repeated descriptions will be omitted. Please refer to the foregoing embodiments for the omitted descriptions, which will not be repeated hereinafter.

Figure 2A:
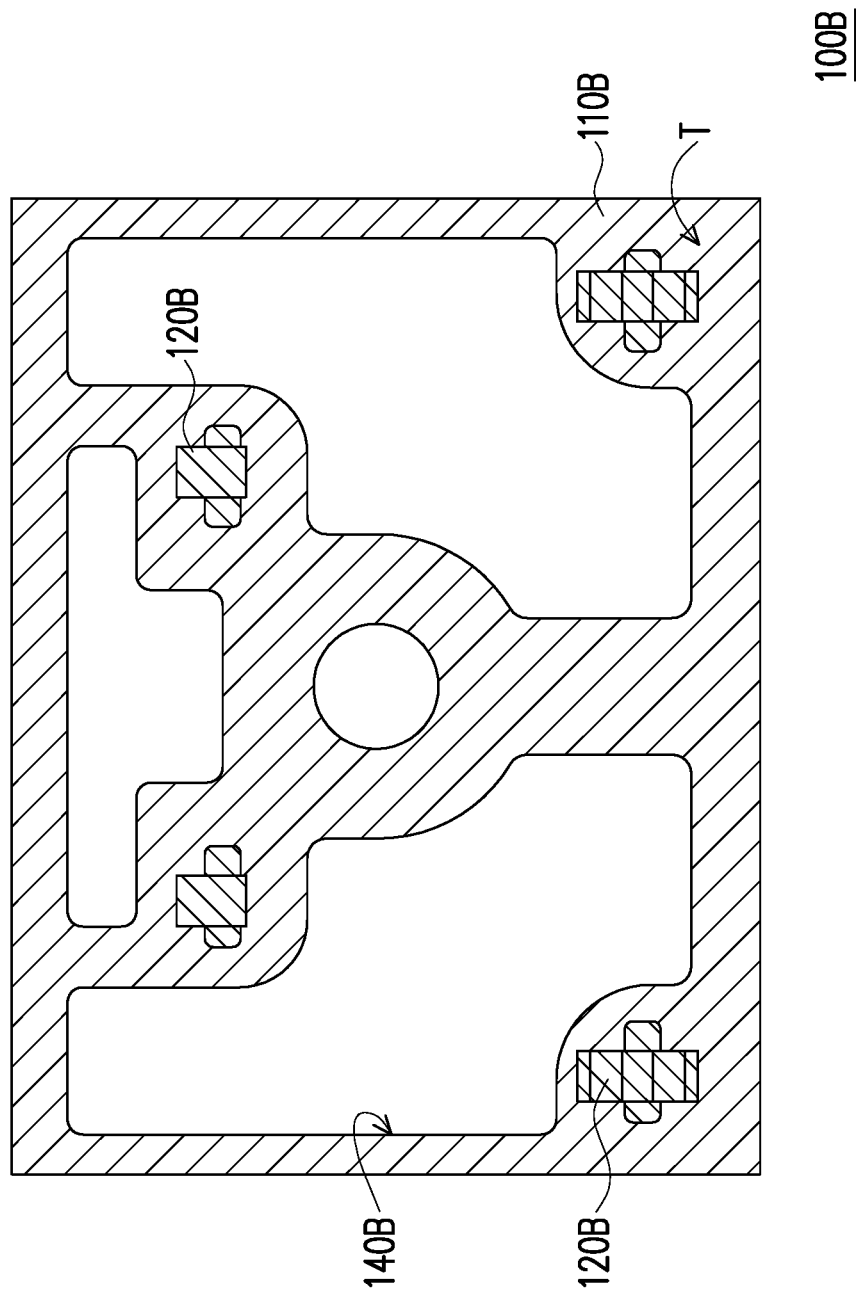
FIG. 2A is a schematic top view of a base plate according to another embodiment of the disclosure.
Figure 2B:
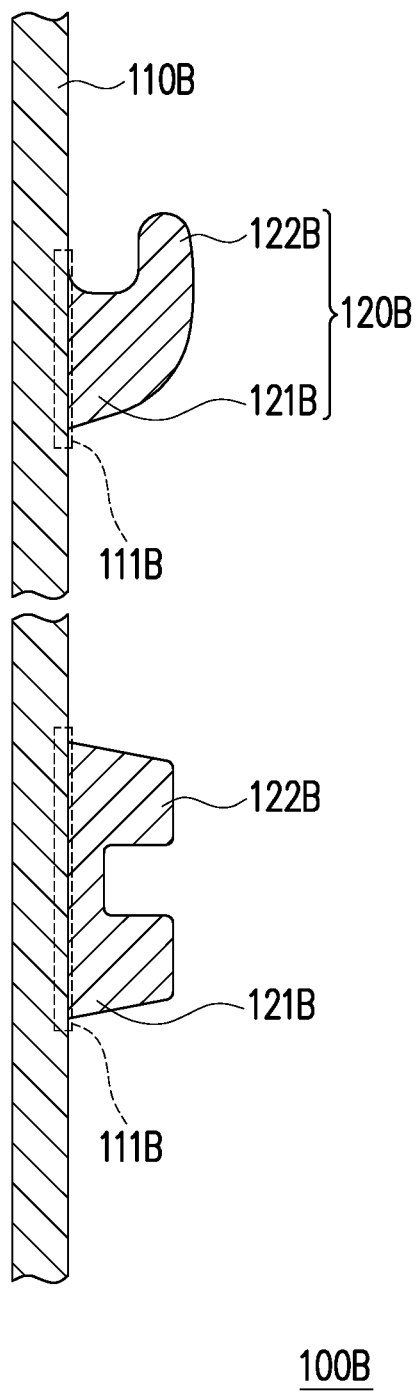
FIG. 2B is a schematic side view of the base plate of FIG. 2A.

FIG. 2A is a schematic top view of a base plate according to another embodiment of the disclosure. FIG. 2B is a schematic side view of the base plate of FIG. 2A. It should be noted that the cross section of FIG. 2B and the cross section of FIG. 1B are taken at different positions to more clearly show the structure of the connecting member. Because of the position of the cross section, the hollow region of the base plate is not shown in FIG. 2B.

Referring to FIG. 2A and FIG. 2B, in the present embodiment, the base plate 100B is slightly different from the base plate 100A of FIG. 1B, and the main difference lies in the forming method of the connecting member.

To be more specific, the material of the connecting member 120B of the base plate 100B of the present embodiment is different from the material of the thermally sensitive material plate 110B. That is, the connecting member 120B is additionally molded on the thermally sensitive material plate 110B, wherein the thermally sensitive material plate 110B is, for example, a fiber composite material plate and the material of the connecting member 120B is, for example, plastic.

As shown in FIG. 2B, in the present embodiment, the connecting member 120B includes a junction part 121B and a connection part 122B extending from the junction part 121B. The junction part 121B is connected to the thermally sensitive material plate 110B, and a connection part 122B is away from the first surface T of the thermally sensitive material plate 110B. The thermally sensitive material plate 110B has a junction region 111B where the junction part 121B is joined thereto. In the present embodiment, the junction region 111B is located on the first surface T, and the junction part 121B is joined to the junction region 111B.

In the present embodiment, the base plate 100B is manufactured, for example, by first stamping (punching) the thermally sensitive material plate 110B to form a plurality of openings, which include a hollow region 140B that allows light to pass through (refer to FIG. 2A), for example. The thermally sensitive material plate 110B is deburred to form the desired shape. Next, an accommodating space (molding cavity) for housing the thermally sensitive material plate 110B is formed with a molding apparatus (not shown). Furthermore, the molding apparatus is formed with a cavity in which a molten injection material is injected. That is, the cavity, which is corresponding to the predetermined region of the thermal sensitive material plate 110B, is provided for molding the connecting member 120B. Moreover, the cavity is communicating with the accommodating space and configured to open to outside of the molding apparatus.

Then, the thermally sensitive material plate 110B is placed in the accommodating space (molding cavity) of the molding apparatus, and injection molding is performed after the molding apparatus is closed. At an injection molding position, a molten injection material (e.g., plastic material) is injected into the closed injection mold through the cavity. The molten injection material (e.g., plastic material) flows toward to the thermally sensitive material plate 110B until the cavity is fully filled, and then the plastic material is solidified to form the connecting member 120B, so that the plastic material covers a part of the thermally sensitive material plate 110B in the molding apparatus to mold the connecting member 120B on the junction region 111B (as shown in FIG. 2B). After the plastic material is cooled, the molding apparatus is opened and the thermally sensitive material plate 110B is taken out. The connecting member 120B is integrally formed with the thermally sensitive material plate 110B.

In the present embodiment, the connecting member 120B is integrally formed with the thermally sensitive material plate 110B by insert molding. Various molded articles can be formed by using the molding process, such as an injection molding process. However, other methods may be used in other embodiments. Here, the material of the connecting member 120B is, for example, plastic, but not limited thereto. Since the thermally sensitive material plate 110B of the present embodiment is a fiber composite material plate having a porous structure in the microscopic scale, the bonding force between the thermally sensitive material plate 110B and a heterogeneous material such as plastic is enhanced as the bonding area increases.

Compared to the base plate 100A of FIG. 1B, the base plate 100B of the present embodiment has an advantage that, in the present embodiment, the connecting member 120B is not manufactured by bending the thermally sensitive material plate 110B and the connecting member 120B may be thicker, and therefore, the connecting member 120B may have higher structural strength.

Here, the connecting member 120B has, for example, a hook-shaped, C-shaped, U-shaped, inverted U-shaped structure or any two different clamping structures composed of combination arrangement, but in other embodiments, the connecting members 120B may all have a hook-shaped structure (similar to FIG. 1B). Nevertheless, the connecting member is not limited thereto as long as the connecting member and the support unit can be pivotally connected to each other.

Figure 2C:
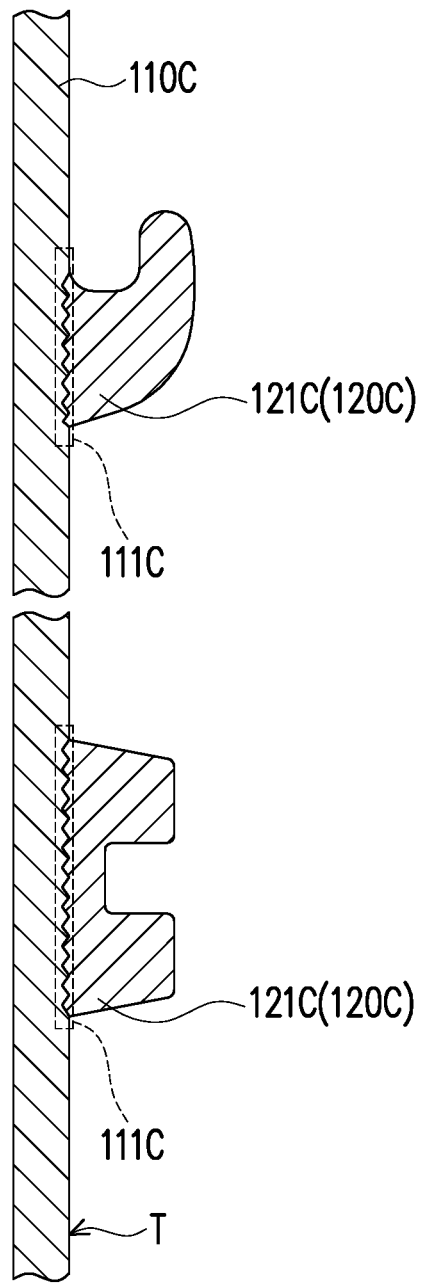
FIG. 2C to FIG. 2E are schematic side views of other forms of the base plate of FIG. 2A.
Figure 2D:
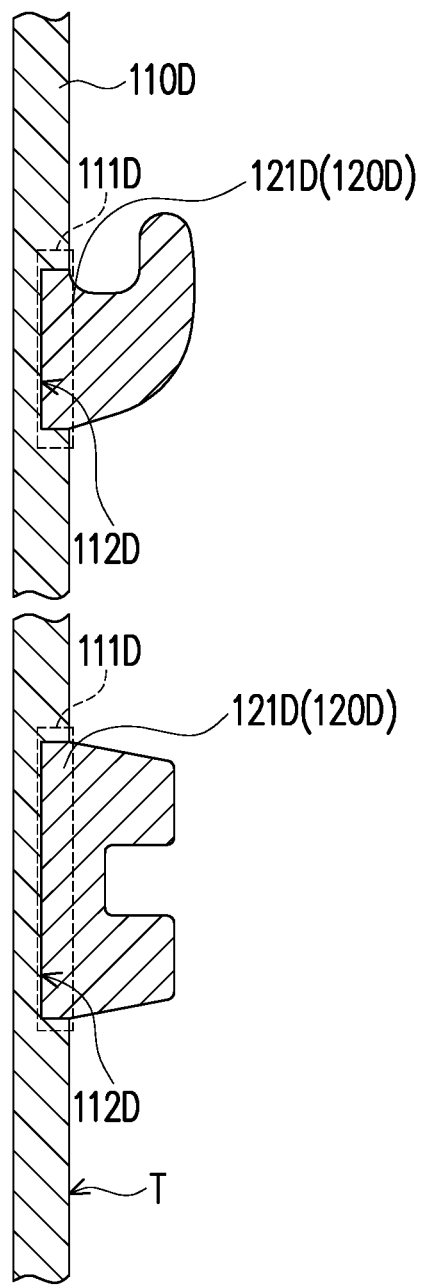
Figure 2E:
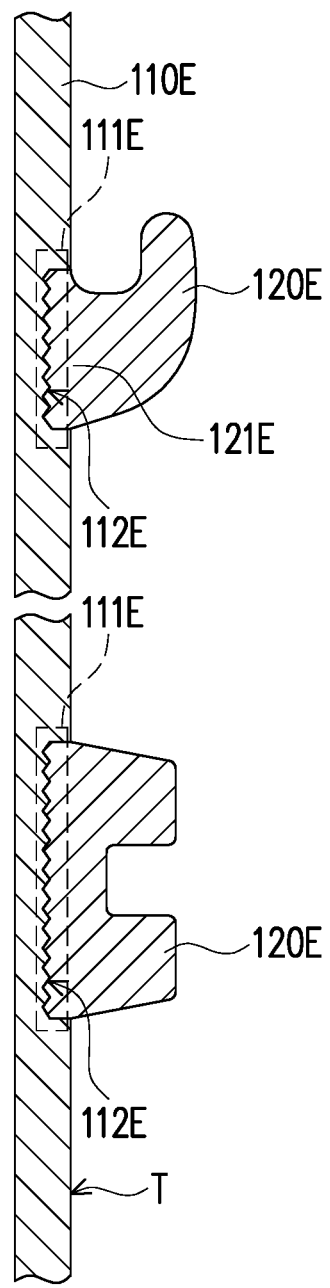

FIG. 2C to FIG. 2E are schematic side views of other forms of the base plate of FIG. 2A. It should be noted that because of the position of the cross section, the hollow region of the base plate is not shown in FIG. 2C to FIG. 2E.

First, referring to FIG. 2C, in the present embodiment, the base plate 100C is slightly different from the base plate 100B of FIG. 2B, and the difference is that the junction region 111C of the thermally sensitive material plate 110C is further surface-processed or surface-treated. For example, the surface may be modified or roughened to increase the bonding force or bonding area between the junction region 111C and the junction part 121C bonded thereto, thereby improving the stability of the connecting member 120C.

Referring to FIG. 2D, in the present embodiment, the base plate 100D is slightly different from the base plate 100B of FIG. 2B, and the difference is that the thermally sensitive material plate 110D includes a recess part 112D recessed on the first surface T, and in the present embodiment, the junction region 111D includes the recess part 112D.

The process of manufacturing the base plate 100D includes, for example, first stamping the thermally sensitive material plate 110D. A predetermined region of the thermally sensitive material plate 110D is heated, and hot-pressed and dented to form a plurality of recess parts 112D recessed on the first surface T. Then, the thermally sensitive material plate 110D is deburred to form the desired shape.

Next, in a manner similar to the embodiment of FIG. 2B, an accommodating space for housing the thermally sensitive material plate 110D is formed with a molding apparatus (not shown) having a cavity for molding the connecting member 120D. The thermally sensitive material plate 110D is placed in the accommodating space of the molding apparatus, and a molten plastic material is injected after the mold is closed. The plastic material is fully filled in the recess parts 112D of the thermally sensitive material plate 110D and the cavity and then solidifies, so that the plastic covers a part of the thermally sensitive material plate 110D in the mold to mold the connecting member 120D on the recess part 112D on the thermally sensitive material plate 110D, wherein the junction part 121D is filled in the recess part 112D. After the plastic material is cooled, the molding apparatus is opened and the thermally sensitive material plate 110D is taken out, and the connecting member 120D is integrally formed with the thermally sensitive material plate 110D.

Such a design has an advantage that the bonding area between the junction part 121D bonded to the junction region 111D and the thermally sensitive material plate 110D is increased, which improves the stability of the connecting member 120D.

Referring to FIG. 2E, in the present embodiment, the base plate 100E is slightly different from the base plate 100D of FIG. 2D, and the difference is that the junction region 111E of the recess part 112E of the thermally sensitive material plate 110E is further surface-processed of surface-treated. For example, the surface may be modified or roughened to increase the bonding force or bonding area between the junction region 111E and the junction part 121E bonded to the junction region 111E, thereby improving the stability of the connecting member 120E.

FIG. 3A to FIG. 3D and FIG. 4A to FIG. 4C are schematic side views of other forms of the base plate according to other embodiments of the disclosure. It should be noted that because of the position of the cross section, the hollow region of the base plate is not illustrated in FIG. 3A to FIG. 3D and FIG. 4A to FIG. 4C.

Figure 3A:
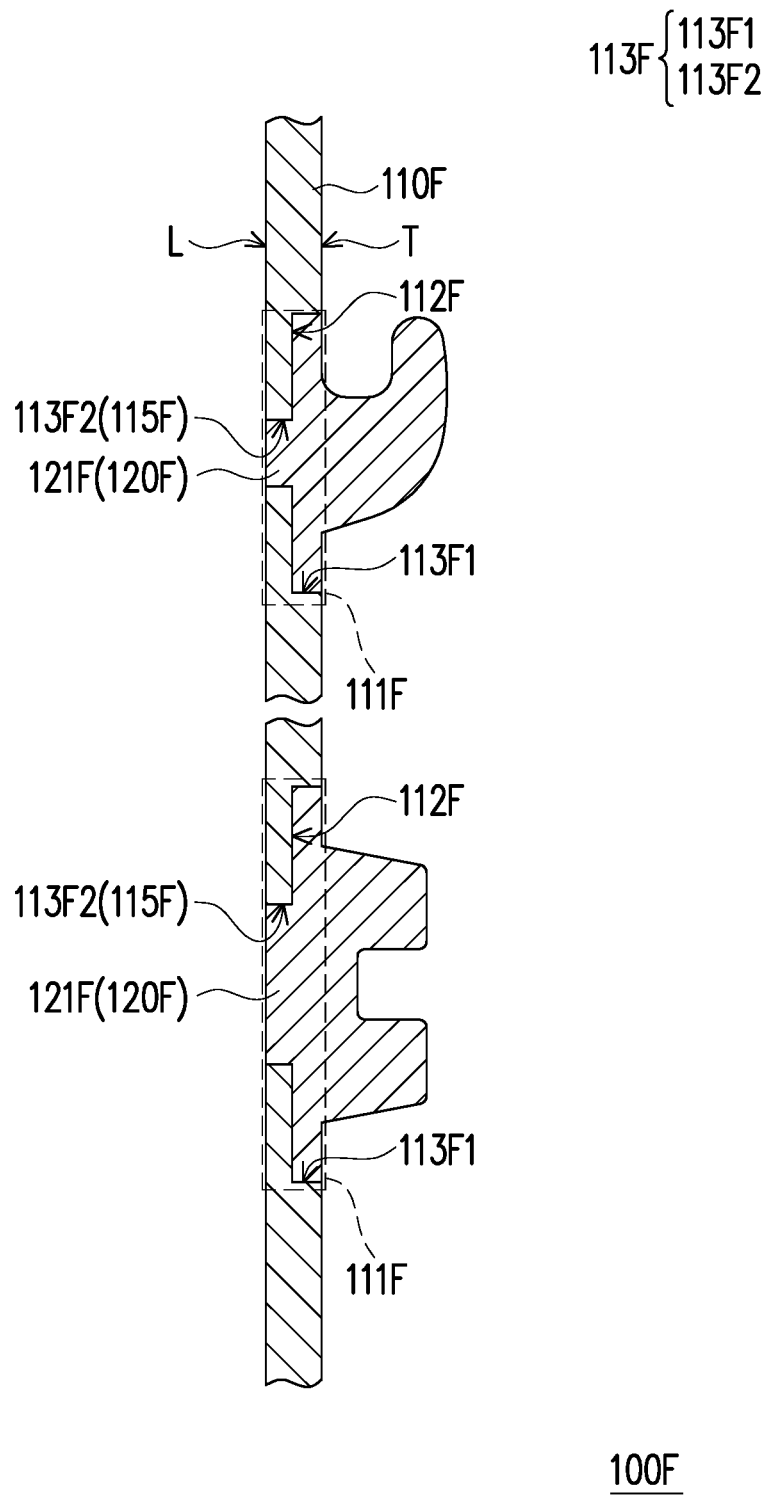
FIG. 3A to FIG. 3D and FIG. 4A to FIG. 4C are schematic side views of other forms of the base plate according to other embodiments of the disclosure.
Figure 3A:
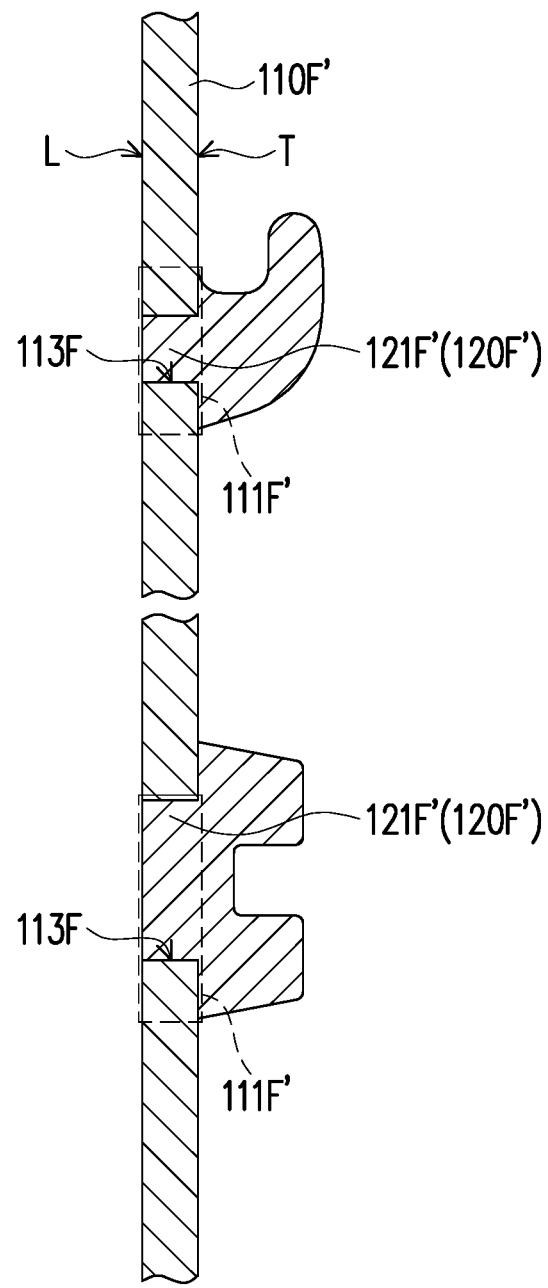

First, referring to FIG. 3A, in the present embodiment, the thermally sensitive material plate 110F has a first surface T and a second surface L opposite to the first surface T, a through hole 113F penetrating the first surface T and the second surface L, and a junction part 121F filled in the through hole 113F.

Specifically, the process of manufacturing the base plate 100F includes, for example, performing first punching on the thermally sensitive material plate 110F to form a plurality of openings, which include a hollow region that allows light to pass through, for example. A predetermined region of the thermally sensitive material plate 110F is heated, and hot-pressed and dented to form a recess part 112F on the thermally sensitive material plate 110F. Then, second punching is performed on the recess part 112F to form a through hole 115F. The recess part 112F communicates with the through hole 115F to form a stepped through hole 113F, or a plurality of through holes 113F may be directly formed in the thermally sensitive material plate 110F, as shown in FIG. 3A'.

Next, the thermally sensitive material plate 110F is deburred to form the desired shape. Furthermore, an accommodating space for housing the thermally sensitive material plate 110F is formed with a molding apparatus (not shown), having a cavity for molding the connecting member 120F. The thermally sensitive material plate 110F is placed in the accommodating space of the mold, and a molten plastic material is injected after the mold is closed so as to form the connecting member 120F on the through hole 113F and fill the junction part 121F in the through hole 113F. After the plastic material is cooled, the molding apparatus is opened and the thermally sensitive material plate 110F is taken out, and the connecting member 120F is integrally formed with the thermally sensitive material plate 110F. In the present embodiment, the bottom surface of the junction part 121F is flush with the second surface L.

Specifically, the stepped through hole 113F of the thermally sensitive material plate 110F includes a first portion 113F1 close to the first surface T, and a second portion 113F2 (that is, the through hole 115F) close to the second surface L. The hole diameter of the first portion 113F1 is larger than the hole diameter of the second portion 113F2.

Further, in another embodiment not shown here, the junction region 111F of the base plate 100F of FIG. 3A may further be surface-processed or surface-treated. The surface of the junction region 111F is modified or roughened to further increase the bonding force or bonding area between the connecting member 120F and the thermally sensitive material plate 110F, thereby improving the stability of the connecting member 120F.

Similarly, in other embodiments not shown here, the thermally sensitive material plate 110F' of the base plate 100F' of FIG. 3A' may also be deburred. After the desired shape is formed, the junction region 111F' of the thermally sensitive material plate 110F' is further surface-processed or surface-treated. For example, the surface may be modified or roughened to increase the bonding force or bonding area between the junction region 111F' and the junction part 121F', thereby improving the stability of the connecting member 120F'.

Referring to FIG. 3A", in the present embodiment, the bottom surface of the junction part 121F" protrudes from the second surface L, thereby improving the stability of the connecting member 120F". In another embodiment not shown here, the bottom surface of the junction part 121F" may protrude from the second surface L and extend along the second surface L beyond the width of the through hole 113 to increase the bonding area between the junction part and the second surface L in the junction region, and the interference, thereby improving the stability of the connecting member 120F". This has the advantage of holding the connecting member firmly in place on the thermally sensitive material plate, thus preventing it from detaching easily.

Figure 3B:
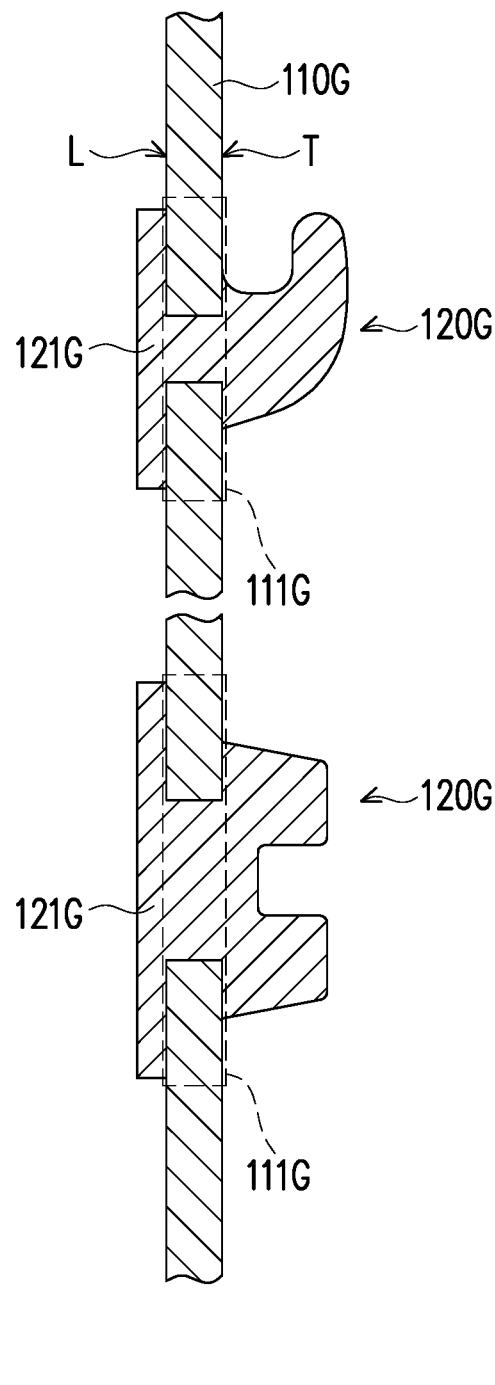

Referring to FIG. 3B, the base plate 100G of the present embodiment is slightly different from the base plate 100F' of FIG. 3A', and the difference is that, in the present embodiment, the bottom of the junction part 121G protrudes from the second surface L and extends along the second surface L of the thermally sensitive material plate 110G beyond the width of the through hole to increase the bonding area between the junction part 121G and the second surface L in the junction region 111G, and use the interference of the junction part 121G with the second surface L to improve the stability of the connecting member 120G.

In another embodiment, the second surface L may be surface-processed or surface-treated. For example, the surface may be modified or roughened to increase the bonding force of bonding area between the junction part 121G and the second surface L, thereby improving the stability of the connecting member 120G.

Figure 3C:
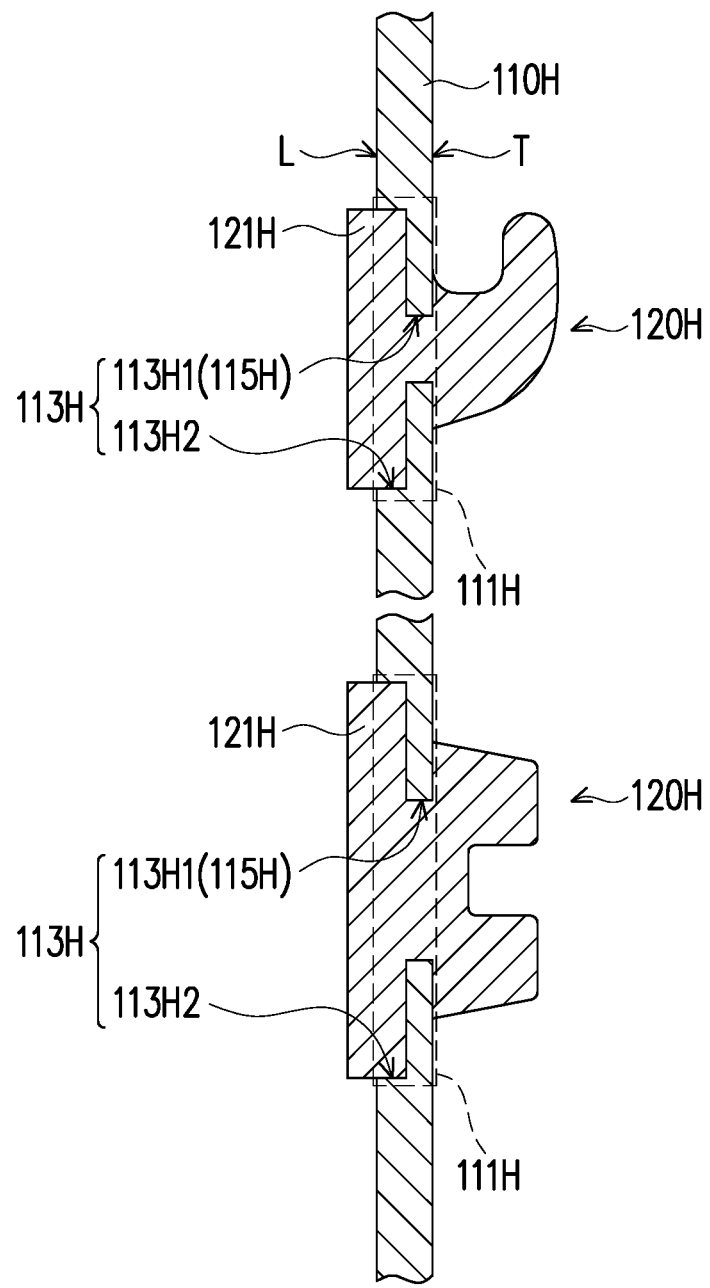

Referring to FIG. 3C, the base plate 100H of the present embodiment is slightly different from the base plate 100G of FIG. 3A, and the difference is that the stepped through hole 113H of the thermally sensitive material plate 110H includes a first portion 113H1 close to the first surface T, and a second portion 113H2 close to the second surface L. The hole diameter of the second portion 113H2 is larger than the hole diameter of the first portion 113H1.

Specifically, after the through hole 115H (that is, the first portion 113H1) is formed in the thermally sensitive material plate 110H, a recess is formed around the through hole 115H (that is, the first portion 113H1) on the second surface L to form the second portion 113H2. In the present embodiment, the junction part 121H is fully filled in the first portion 113H1 and the second portion 113H2 (that is, the stepped through hole 113H), and since the hole diameter of the second portion 113H2 is larger than the hole diameter of the first portion 113H1, the interference of the junction part 121H in the second portion 113H2 with the thermally sensitive material plate 110H improves the stability of the connecting member 120H.

In the present embodiment, the bottom of the junction part 121H protrudes from the second surface L. In other embodiments, the bottom of the junction part 121H may be flush with the second surface L or protrude from the second surface L and extend along the second surface L of the thermally sensitive material plate 110H. Nevertheless, the disclosure is not limited thereto.

Figure 3D:
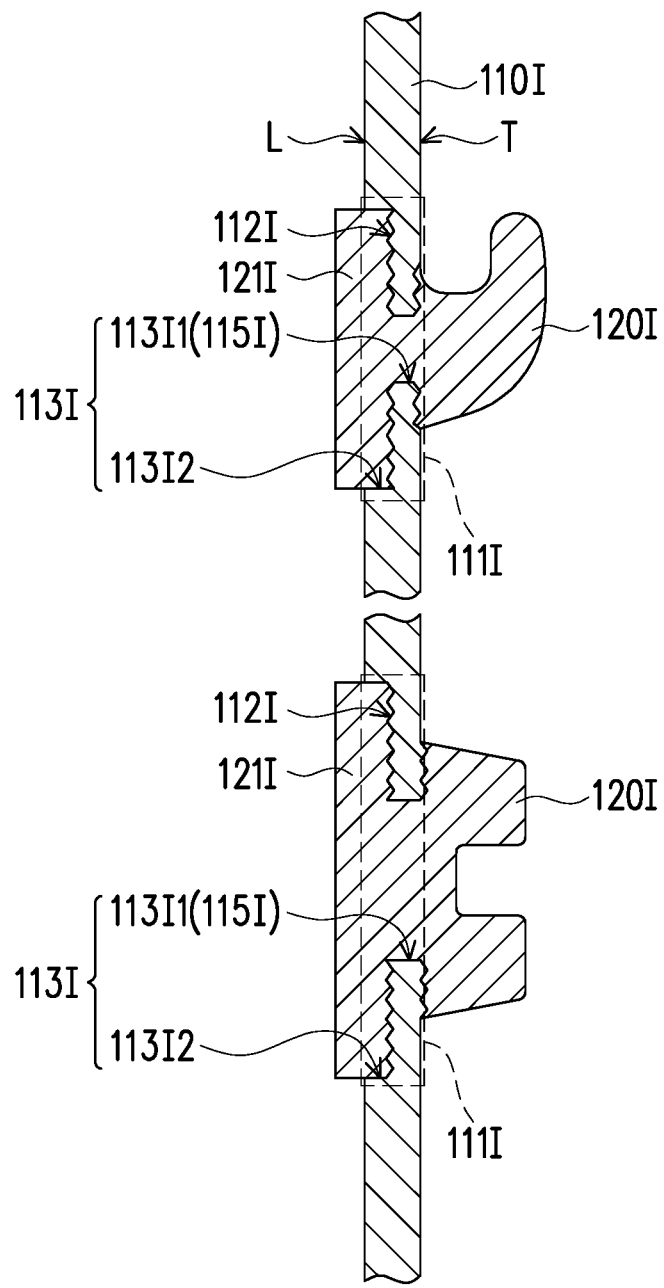

Referring to FIG. 3D, the base plate 100I of the present embodiment is slightly different from the base plate 100H of FIG. 3C, and the difference is that the process of manufacturing the base plate 100I further includes processing or treating the surface of the junction region 111I. In the present embodiment, the junction region 111I is the region where the connecting member 120I is in contact with the thermally sensitive material plate 110I. Specifically, the surface of the junction region 111I is modified or roughened to further increase the bonding force or bonding area between the junction part 121I in the stepped through hole 113I and the thermally sensitive material plate 110I, thereby improving the stability of the connecting member 120I. The stepped through hole 113I includes a first portion 113I1 close to the first surface T, and a second portion 113I2 close to the second surface L, and the hole diameter of the second portion 113I2 is larger than the hole diameter of the first portion 113I1.

In the present embodiment, the bottom surface of the junction part 121I protrudes from the second surface L. In other embodiments, the bottom surface of the junction part 121I may be flush with the second surface L or the bottom surface of the junction part 121I may protrude from the second surface L and extend along the second surface L of the thermally sensitive material plate 110I. Nevertheless, the disclosure is not limited thereto.

Figure 4A:
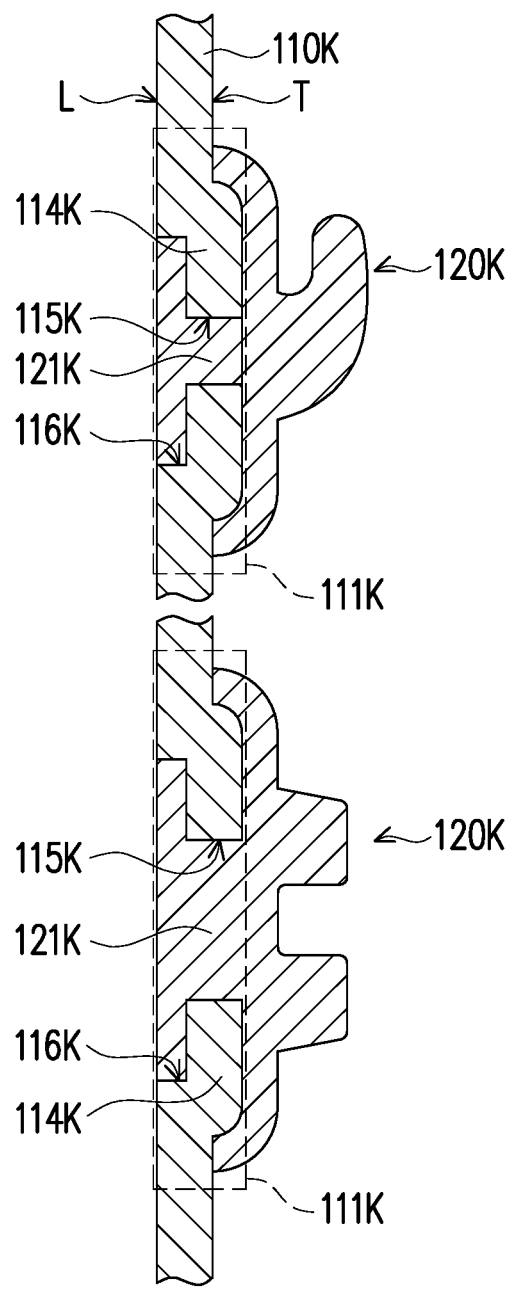

Referring to FIG. 4A, the thermally sensitive material plate 110K of the base plate 100K of the present embodiment includes a through hole 115K and a protrusion structure 114K which is formed to protrude along the extending direction perpendicular to the first surface T around the through hole 115K.

Specifically, in the present embodiment, the process of manufacturing the base plate 100K includes, for example, performing first stamping (punching) on the thermally sensitive material plate 110K to form a plurality of openings, which include a hollow region that allows light to pass through, for example. A predetermined region of the thermally sensitive material plate 110K is heated and embossed to form the protrusion structure 114K. In the embodiment, the protrusion structure 114K extends upward from the second surface L toward the first surface T and forms a recess 116K therein. Then, second stamping (punching) is performed on a portion corresponding to the protrusion structure 114K to form a through hole 115K. The through hole 115K communicates with the recess 116K and the diameter of the recess 116K is larger than the hole diameter of the through hole 115K. Next, the thermally sensitive material plate 110K is deburred to form the desired shape. In other embodiments, the junction region 111K may further be surface-processed or surface-treated to increase the bonding force or bonding area between the connecting member 120K and the thermally sensitive material plate 110K.

Next, an accommodating space for housing the thermally sensitive material plate 110K is formed with a molding apparatus having a cavity for molding the connecting member 120K. The thermally sensitive material plate 110K is placed in the accommodating space of the mold, and injection molding is performed after the mold is closed. A molten plastic material is injected into the recess 116K and the through hole 115K from one surface of the thermally sensitive material plate 110K and flows toward to the other surface until the cavity is fully filled, and then solidifies, so that the plastic material covers a part of the thermally sensitive material plate 110K in the mold to form the connecting member 120K on the thermally sensitive material plate 110K. In this embodiment, the connecting member 120K is embedded within the recess 116K and the through hole 115K, and surrounds the protrusion structure 114K. After the plastic is cooled, the molding apparatus is opened and the thermally sensitive material plate 110K is taken out, and the connecting member 120K is integrally formed with the thermally sensitive material plate 110K.

Figure 4B:
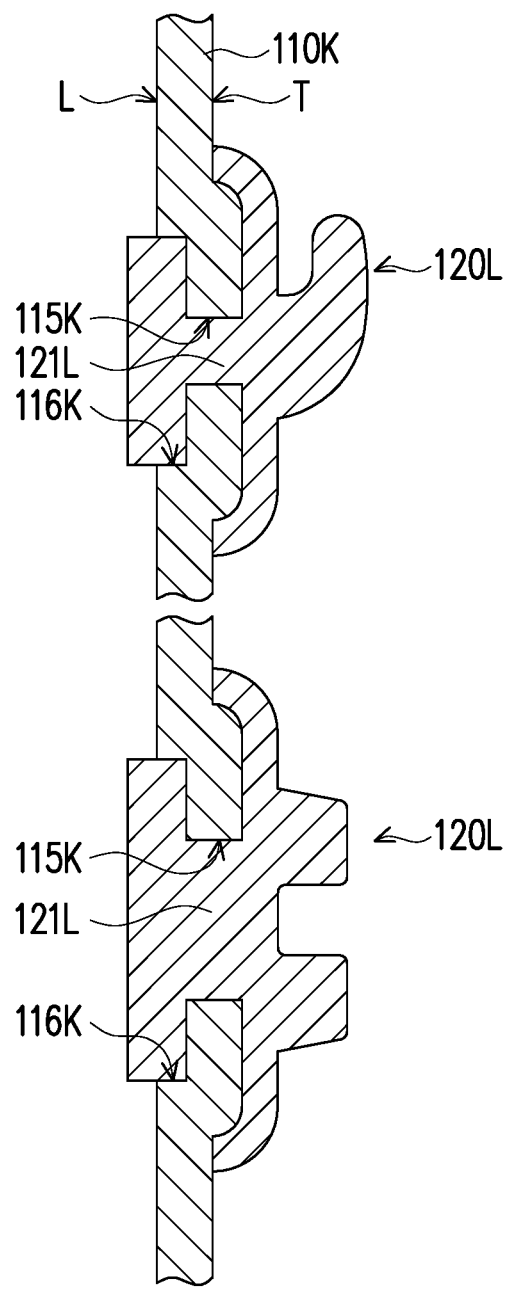
Figure 4C:
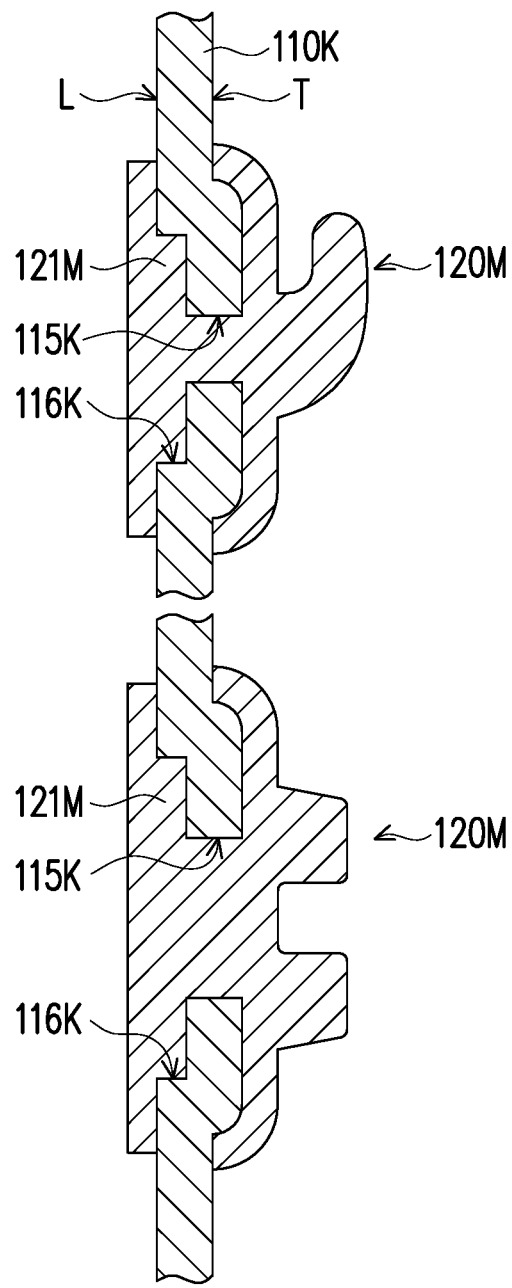

In the present embodiment, the bottom of the junction part 121K is flush with the second surface L of the thermally sensitive material plate 110K. In another embodiment, as shown in FIG. 4B, the bottom of the junction part 121L may protrude from the second surface L of the thermally sensitive material plate 110L. In yet another embodiment, as shown in FIG. 4C, the bottom of the junction part 121M protrudes from the second surface L of the thermally sensitive material plate 110M and extends along the second surface L of the thermally sensitive material plate 110L beyond the width of the recess 116K to increase the bonding area between the junction part 121M and the second surface L in the junction region. Nevertheless, the disclosure is not limited thereto.

Reverting to FIG. 4A, in other embodiments, the process of manufacturing the base plate 100K may include first forming a through hole 115K on the thermally sensitive material plate 110K, and then embossing a portion of the thermally sensitive material plate 110K around the through hole 115K to form a protrusion structure 114K having the through hole 115K. It should be noted that the protrusion structure 114K may be continuous and surround the through hole 115K or may be discontinuous and arranged with respect to the through hole 115K, or a plurality of protrusion structures 114K may be disposed around the through hole 115K. Nevertheless, the disclosure is not limited thereto.

Figure 5A:
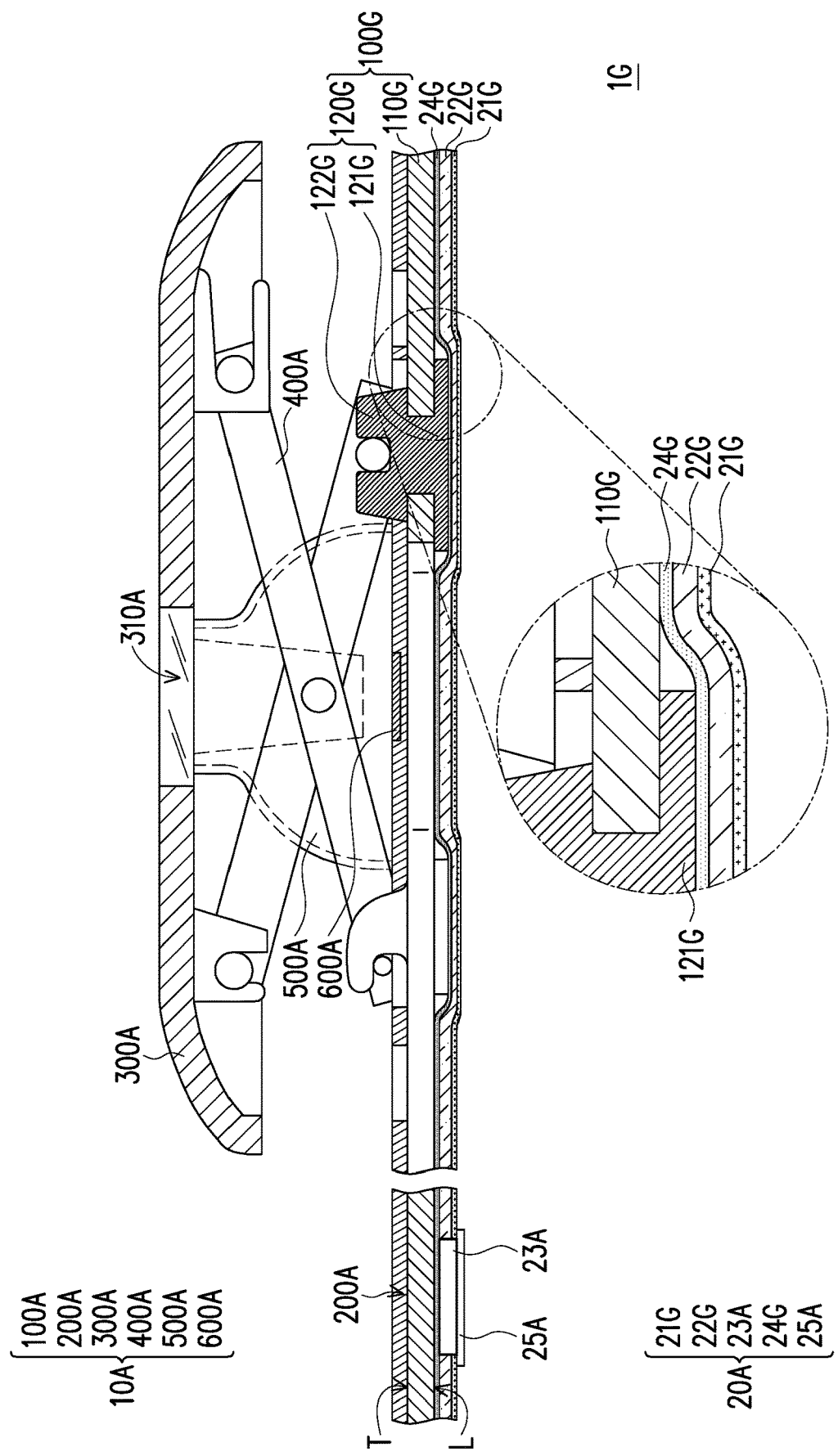
FIG. 5A to FIG. 5C are schematic views of different forms of the base plate of FIG. 3B applied to an illuminated key input device.
Figure 5B:
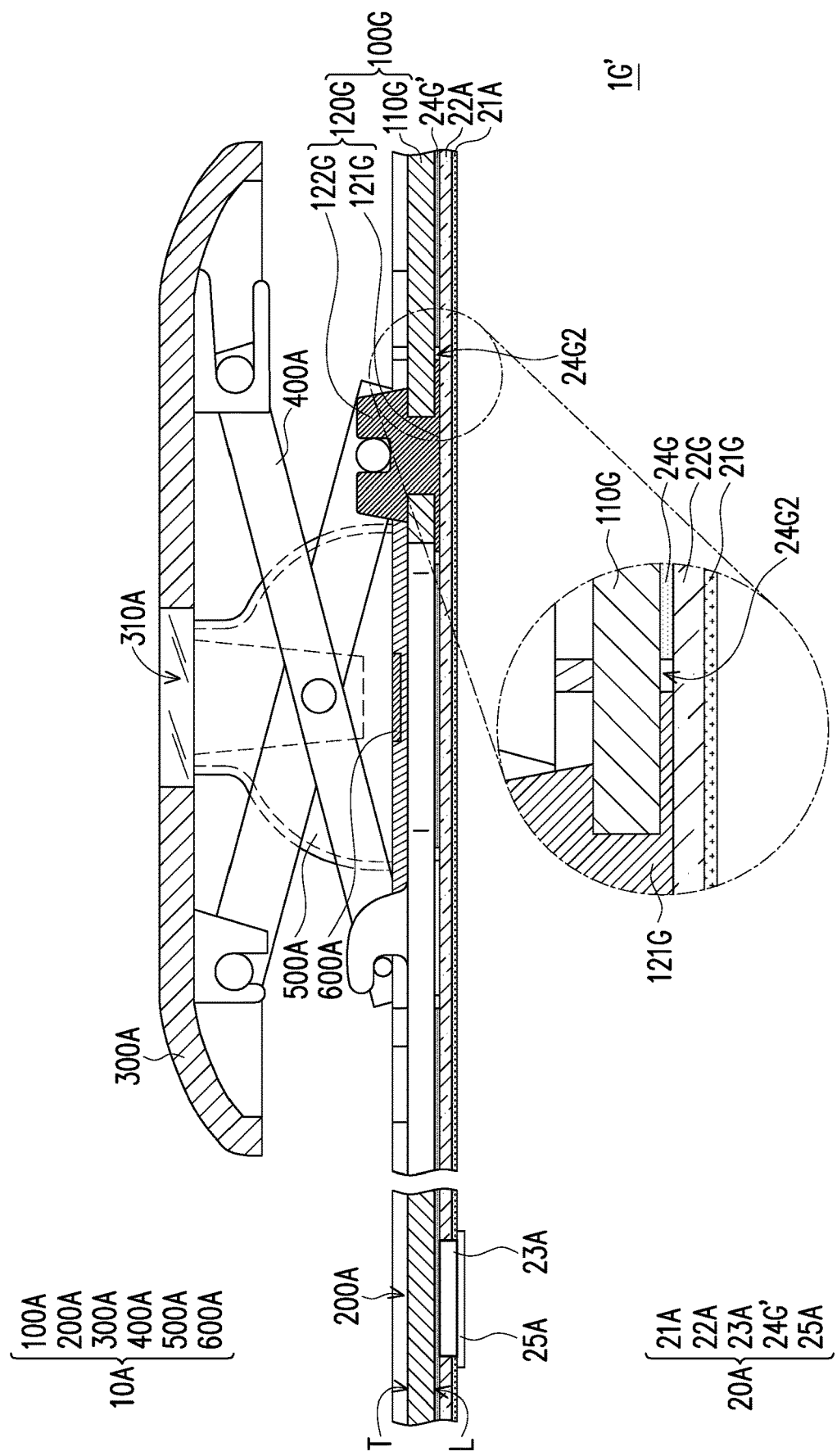
Figure 5C:
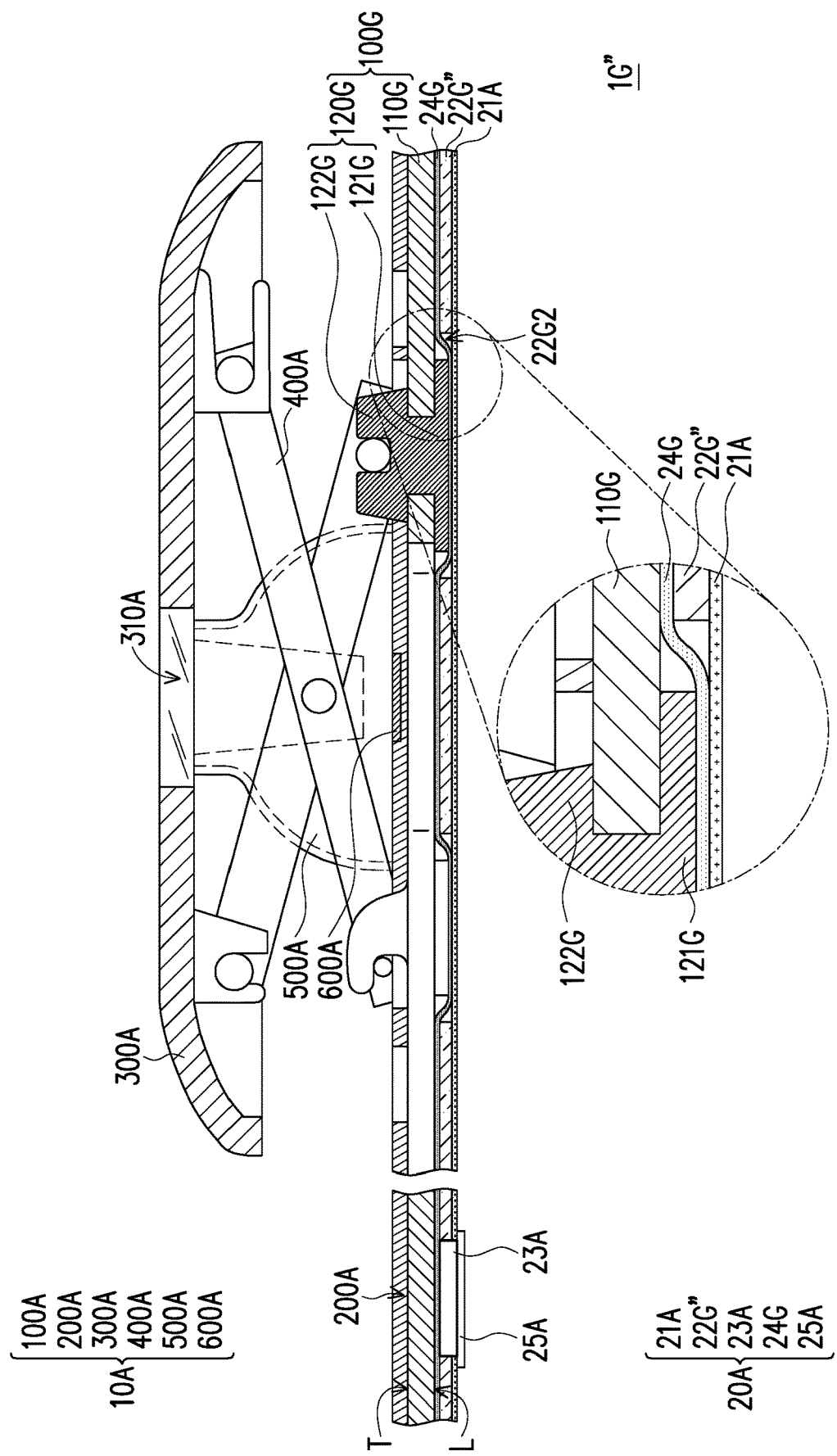

For convenience of description, the base plate of FIG. 3B will be taken as an example in the following descriptions. FIG. 5A to FIG. 5C are schematic views of different forms of the base plate of FIG. 3B applied to an illuminated key input device. It should be noted that the cross section of FIG. 3B and the cross sections of FIG. 5A to FIG. 5C are taken at different positions, and because of the position of the cross section of the illuminated key input device, the transparent region of the light-shielding layer is not illustrated in FIG. 5A to FIG. 5C.

First, referring to FIG. 5A, the bottom portion of the connecting member 120G of the present embodiment protrudes from the second surface L of the thermally sensitive material plate 110G. Specifically, since the light-shielding layer 24G of the backlight module 20A having flexibility which can be easily deformed, the light-shielding layer 24G can be in contact with the bottom of the connecting member 120G when the backlight module 20A is attached thereto.

Referring to FIG. 5B, the light-shielding layer 24G' of the illuminated key input device 1G' of the present embodiment includes a first hole 24G2 corresponding to the bottom of the connecting member 120G for accommodating the bottom portion of the connecting member 120G protruded from the second surface L.

Specifically, as the bottom portion of the connecting member 120G of FIG. 5B protrudes from the second surface L, the light-shielding layer 24G' is provided with the first hole 24G2, which allows the bottom portion of the connecting member 120G to enter the hole 24G2 to avoid interference. In the present embodiment, the bottom portion of the connecting member 120G is a part of the junction part 121G. It should be noted that, in the above embodiments, when the bottom portion of the connecting member protrudes from the second surface L, the light-shielding layer of the backlight module may be provided with a first hole corresponding to the bottom of the connecting member to provide a space for the bottom portion of the connecting member 120G.

Referring to FIG. 5C, the light-guiding layer 22G" of the illuminated key input device 1G" of the present embodiment has a second hole 22G2. Specifically, as the bottom portion of the connecting member 120G of FIG. 3B protrudes from the second surface L, since the light-shielding layer 24G of the backlight module 20A having flexibility which can be easily deformed, the light-shielding layer 24G can be in contact with the bottom of the connecting member 120G when the backlight module 20A is attached thereto. Furthermore, the light-shielding layer 24G of the present embodiment is bonded to the reflective layer 21A through the second hole 22G2 to avoid light leakage.

It should be noted that, in the above embodiments, when the bottom portion of the connecting member protrudes from the second surface L, the light-guiding layer of the backlight module may be provided with a second hole corresponding to the bottom of the connecting member to provide a space for the bottom portion of the connecting member 120G.

Figure 6A:
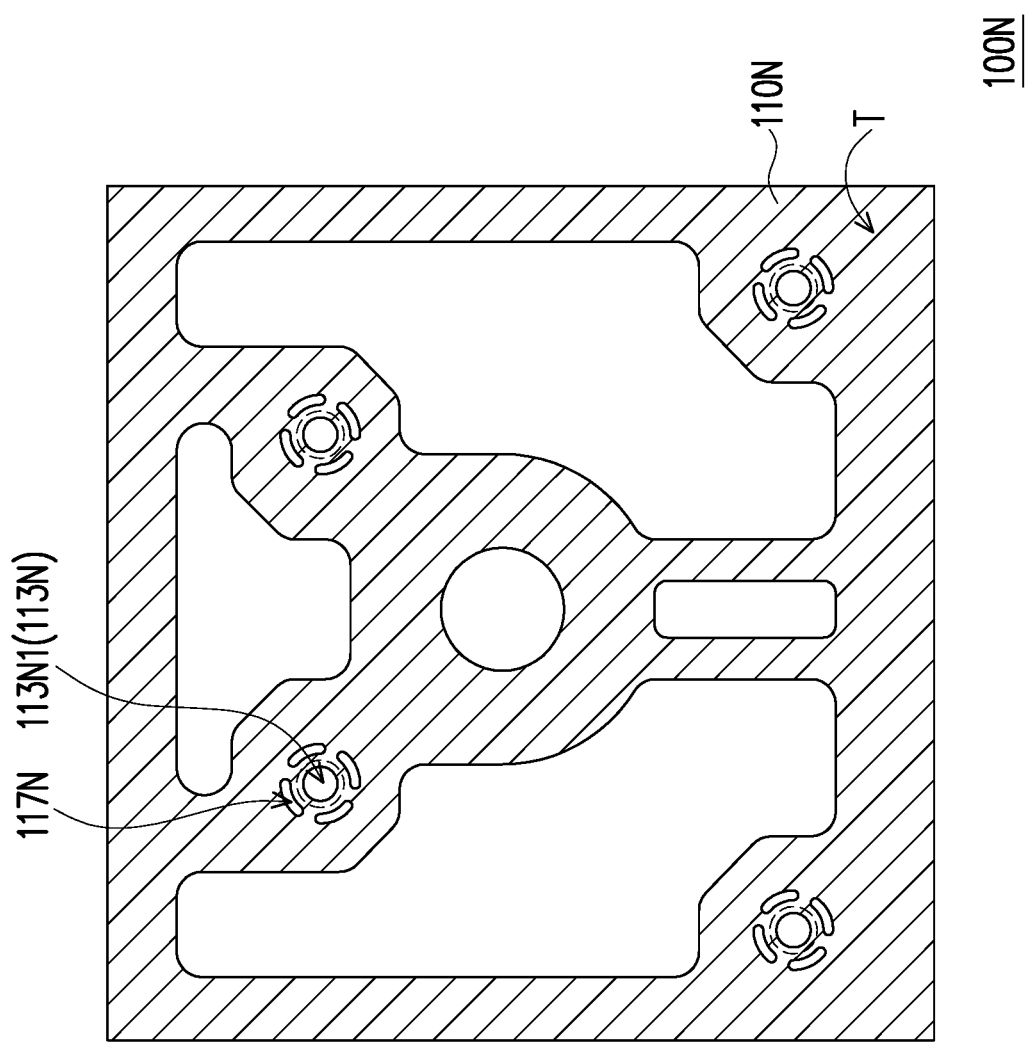
FIG. 6A is a schematic top view of a thermally sensitive material plate according to another embodiment of the disclosure.
Figure 6B:
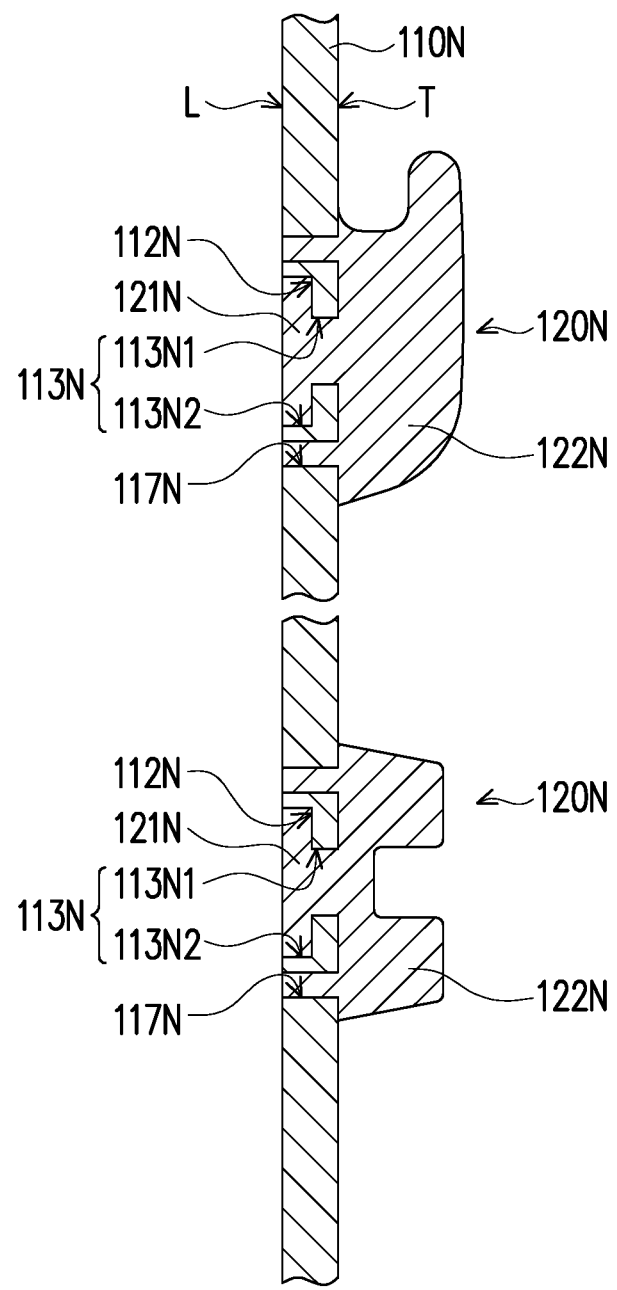
FIG. 6B is a schematic partial side view of the thermally sensitive material plate of FIG. 6A molded with a connecting member.

FIG. 6A is a schematic top view of a thermally sensitive material plate according to another embodiment of the disclosure. FIG. 6B is a schematic partial side view of the thermally sensitive material plate of FIG. 6A molded with a connecting member. It should be noted that FIG. 6A is a schematic view before the connecting member 120N of FIG. 6B is molded on the thermally sensitive material plate 110N, and because of the position of the cross section, the hollow region of the base plate is not illustrated in FIG. 6B.

Referring to FIG. 6A and FIG. 6B, the process of manufacturing the base plate 100N includes, for example, performing first stamping (punching) on the thermally sensitive material plate 110N to form a plurality of openings, which include a hollow region that allows light to pass through, for example. A stepped through hole 113N (including a first portion 113N1 and a second portion 113N2 communicating with the first portion 113N1) is formed in the thermally sensitive material plate 110N by the similar process described above in the embodiment of FIG. 3C, which will not be repeated here. Then, at least one slot 117N (the slot 117N of FIG. 6A is illustrated an arc hole, but not limited thereto; through holes having other shapes such as rectangular slot may also be adopted) is formed around the stepped through hole 113N (the stepped through hole 113N of FIG. 6A is illustrated a circular hole, but not limited thereto) on the thermally sensitive material plate 110N. Thereafter, the thermally sensitive material plate 110N is deburred to form the desired shape. Furthermore, an accommodating space (molding cavity) for housing the thermally sensitive material plate 110N is formed with a molding apparatus (not shown), and the molding apparatus has a cavity for molding the connecting member 120N. The thermally sensitive material plate 110N is placed in the accommodating space of the molding apparatus, and injection molding is performed after the mold is closed. A molten plastic material is injected into the recess part 112N (the second portion 113N2 of the stepped through hole 113N), the through hole (the first portion 113N1 of the stepped through hole 113N), and the slot 117N from one surface of the thermally sensitive material plate 110N and flows toward the other surface until the cavity is fully filled, and then solidifies, so that the plastic material covers a part of the thermally sensitive material plate 110N in the molding apparatus to mold the connecting member 120N on the thermally sensitive material plate 110N. After the plastic is cooled, the mold is opened and the thermally sensitive material plate 110N is taken out, and the connecting member 120N is integrally formed with the thermally sensitive material plate 110N.

In the present embodiment, the stepped through hole 113N of the thermally sensitive material plate 110N includes the first portion 113N1 close to the first surface T, and the second portion 113N2 close to the second surface L. The hole diameter of the second portion 113N2 is larger than the hole diameter of the first portion 113N1, and the interference of the junction part 121N in the second portion 113N2 with the thermally sensitive material plate 110N improves the stability of the connecting member 120N. In addition, as the junction part 121N is disposed through and filled in the slot 117N, the connecting member 120N and the thermally sensitive material plate 110N are firmly fixed. The number of the slots 117N may be set as desired. In the present embodiment, the number of the slots 117N is, for example, a multiple of 2, but not limited thereto. In addition, the bottom surface of the junction part 121N is flush with the second surface L.

With the above designs, the connecting member 120N can be formed by filling a part of the junction part 121N in the stepped through hole 113N, and what is more, the other part of the junction part 121N through the slot 117N to connect the connection part 122N to form a one-piece connecting member 120N, so as to ensure that the connecting member 120N and the thermally sensitive material plate 110N are firmly combined. Therefore, the disclosure greatly improves the joining strength between the connecting member and the thermally sensitive material plate and thereby solves the problem that the connecting member may easily fall off from the bottom plate when receiving an excessive force from the user or being pulled at an improper angle.

In another embodiment, the stepped through hole 113N may further be surface-processed or surface-treated. In other embodiments, the surface in the junction region of the thermally sensitive material plate 110N may also be processed to improve the stability of the connecting member 120N.

FIG. 6C to FIG. 6D, FIG. 7A to FIG. 7C, and FIG. 8A to FIG. 8C are schematic side views of other forms of the base plate according to other embodiments of the disclosure. It should be noted that because of the position of the cross section, the hollow region of the base plate is not illustrated in FIG. 6C to FIG. 6D, FIG. 7A to FIG. 7C, and FIG. 8A to FIG. 8C.

Figure 6C:
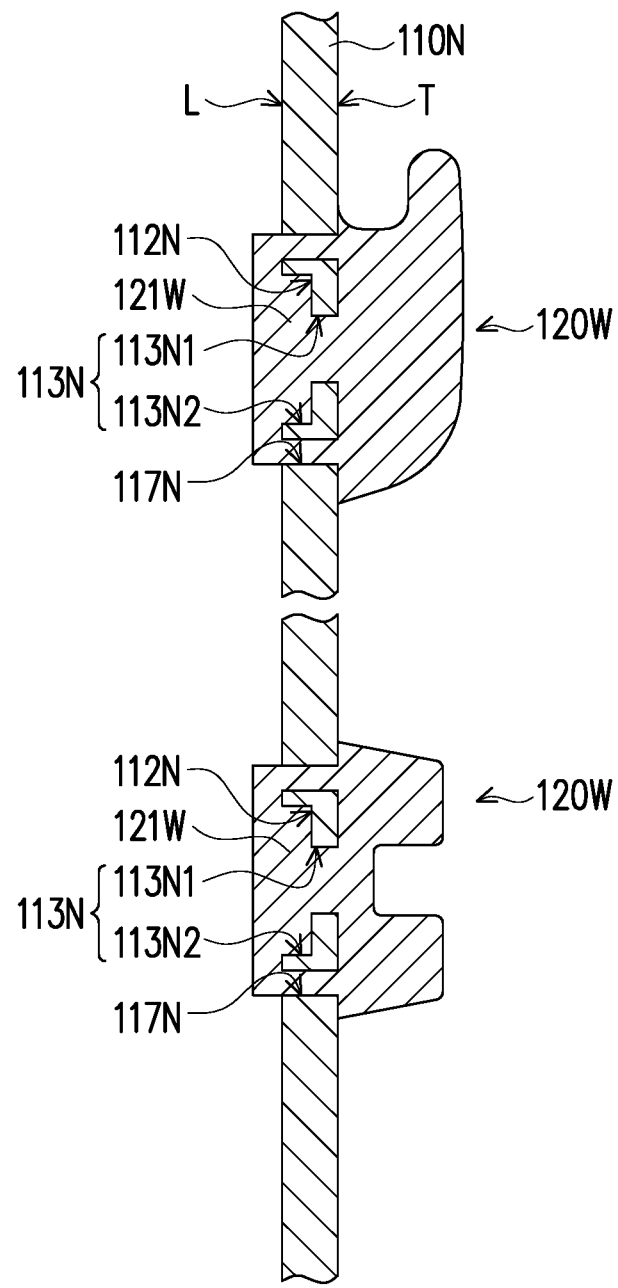
FIG. 6C to FIG. 6D, FIG. 7A to FIG. 7C, and FIG. 8A to FIG. 8C are schematic side views of other forms of the base plate according to other embodiments of the disclosure.

First, referring to FIG. 6C, the base plate 100W is slightly different from the base plate 100N of FIG. 6B, and the difference is that the bottom portion of the junction part 121W protrudes from the second surface L to improve the stability of the connecting member 120W.

Figure 6D:
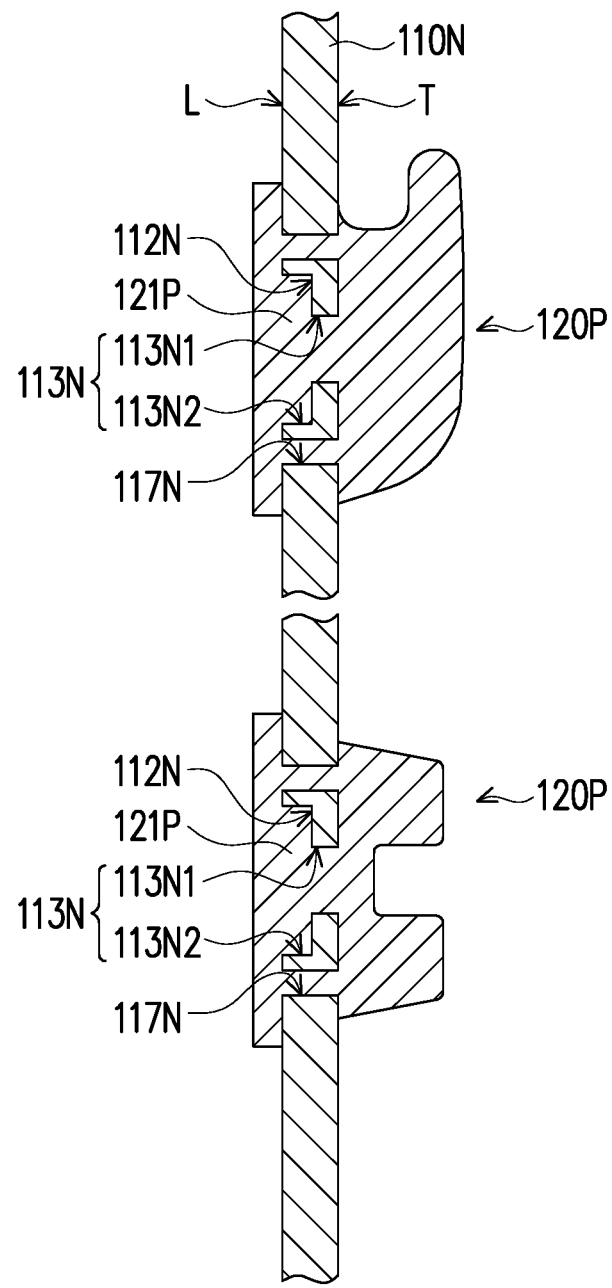

Referring to FIG. 6D, the base plate 100P is slightly different from the base plate 100W of FIG. 6C, and the difference is that the bottom of the junction part 121P protrudes from the second surface L and extends along and covers the second surface L beyond the slot 117N to increase the bonding area between the junction part 121P and the second surface L in the junction region, thereby improving the stability of the connecting member 120P.

Figure 7A:
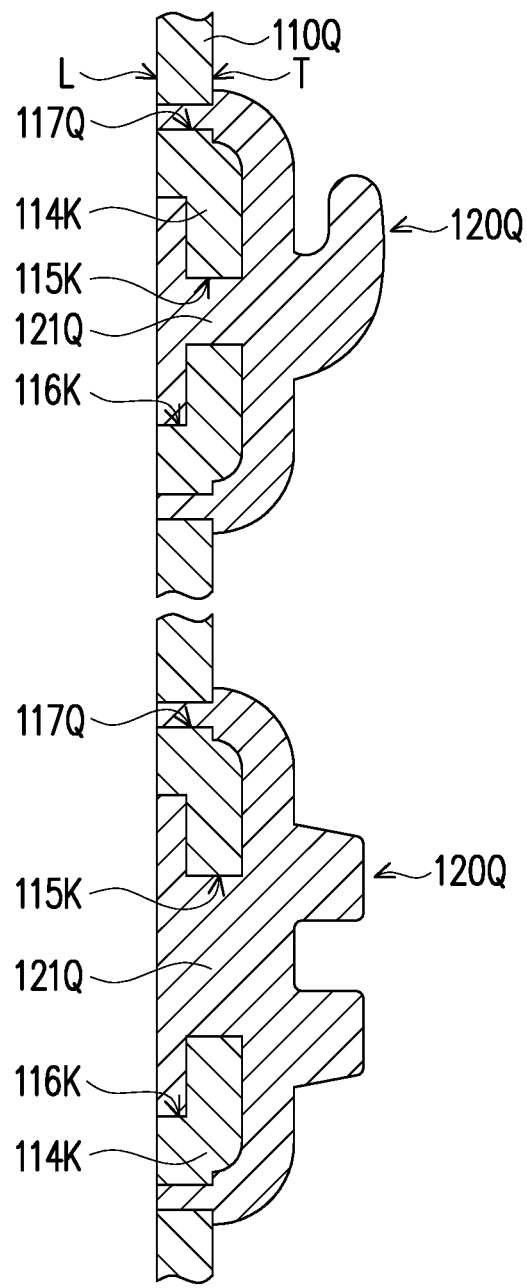

Referring to FIG. 7A, the base plate 100Q is slightly different from the base plate 100K of FIG. 4A, and the difference is that at least one slot 117Q is formed around the protrusion structure 114K on the thermally sensitive material plate 110Q so as to firmly join the junction part 121Q to the thermally sensitive material plate 110Q. In the present embodiment, the bottom surface of the junction part 121Q is flush with the second surface L.

Figure 7B:
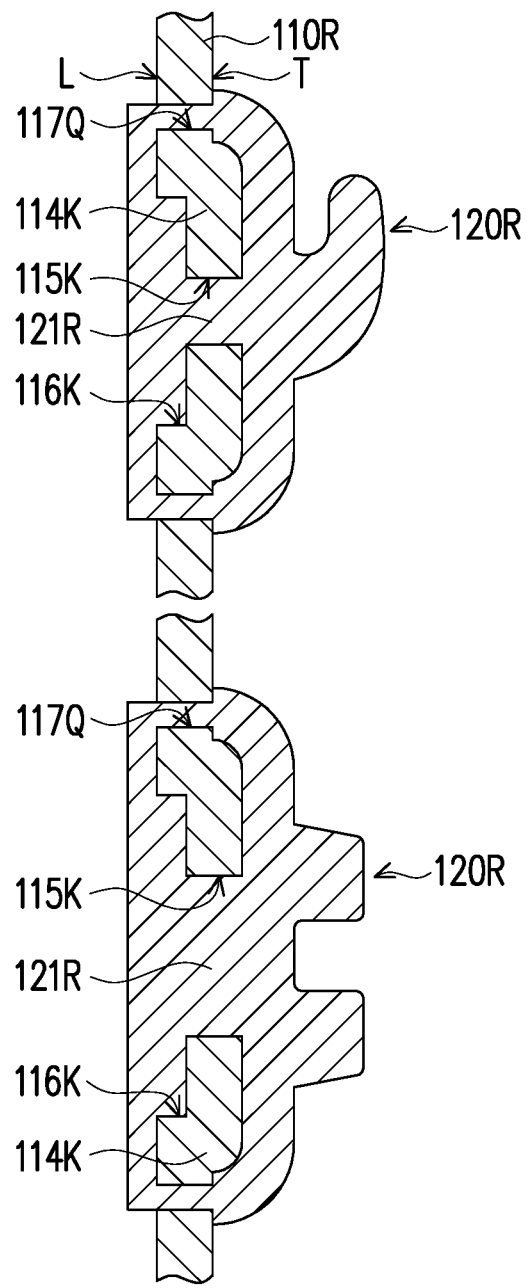

Referring to FIG. 7B, the base plate 100R is slightly different from the base plate 100Q of FIG. 7A, and the difference is that the bottom portion of the junction part 121R protrudes from the second surface L so as to firmly join the junction part 121R to the thermally sensitive material plate 110R and improve the stability of the connecting member 120R.

Figure 7C:
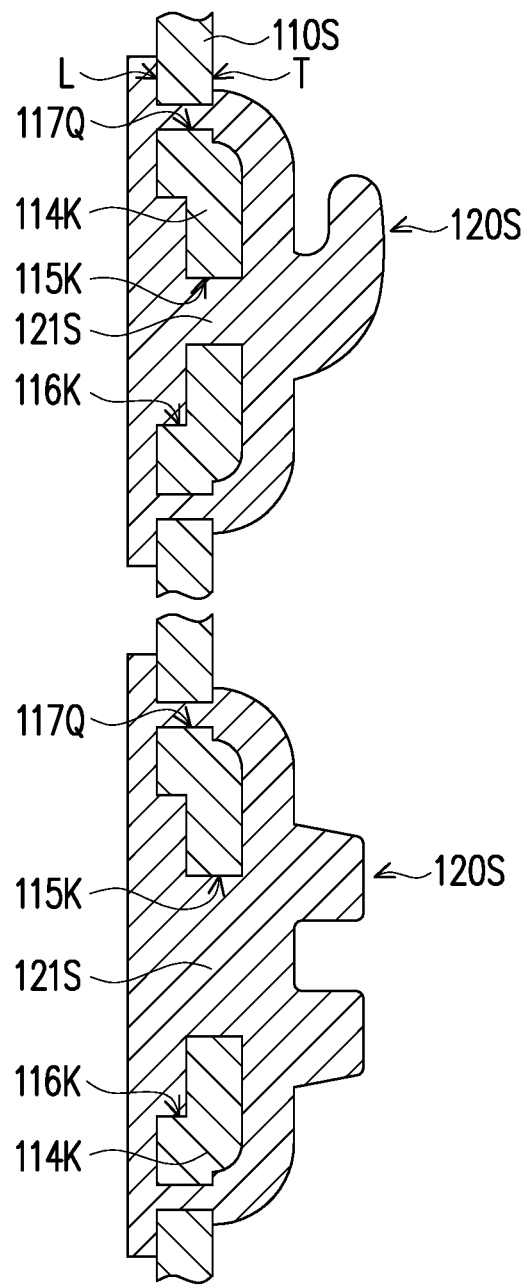

Referring to FIG. 7C, the base plate 100S is slightly different from the base plate 100Q of FIG. 7A, and the difference is that the bottom portion of the junction part 121S protrudes from the second surface L and extends along and covers the second surface L beyond the slot 117Q so as to firmly join the junction part 121S to the thermally sensitive material plate 110S and improve the stability of the connecting member 120S.

Figure 8A:
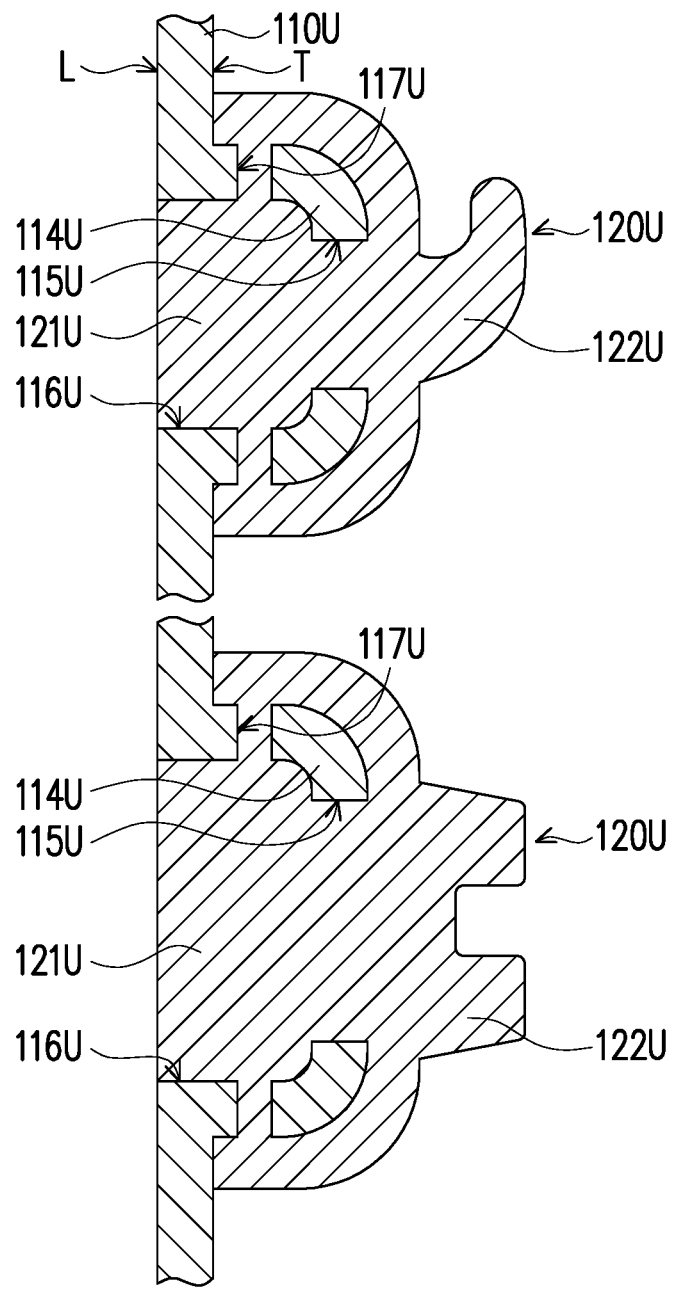

Referring to FIG. 8A, in the present embodiment, the protrusion structure 114U of the base plate 100U has at least one slot 117U, and the slot 117U may be an opening that penetrates the side wall of the protrusion structure 114U in a transverse direction or an opening that penetrates the side wall of the protrusion structure 114U in a vertical direction. With the above designs, the connecting member 120U can be formed by filling a part of the junction part 121U in the through hole 115U and the recess 116U of the protrusion structure 114U, and what is more, the other part of the junction part 121U passing through the slot 117U to connect the connection part 122U to form a one-piece connecting member 121U, so as to ensure that the connecting member 120U and the thermally sensitive material plate 110U are firmly combined. Therefore, the disclosure greatly improves the joining strength between the connecting member and the thermally sensitive material plate and thereby solves the problem that the connecting member may easily fall off from the thermally sensitive material plate when receiving an excessive force from the user or being pulled at an improper angle.

In addition, in the present embodiment, the bottom surface of the junction part 121U is flush with the second surface L.

Specifically, in the present embodiment, the protrusion structure 114U, the through hole 115U and the recess 116U are formed in the thermally sensitive material plate 110U by the similar process described above in the embodiment of FIG. 4A, which will not be repeated here. Thereafter, the protrusion structure 114U is punched to form the slot 117U. Then, the thermally sensitive material plate 110U is deburred to form the desired shape.

Next, an accommodating space (molding cavity) for housing the thermally sensitive material plate 110U is formed with a molding apparatus (not shown), and the molding apparatus has a cavity for molding the connecting member 120U. The thermally sensitive material plate 110U is placed in the accommodating space of the mold, and injection molding is performed after the mold is closed. A molten plastic is injected into the recess 116U, the through hole 115U, and the slot 117U from one surface of the thermally sensitive material plate 110U and flows toward the other surface until the cavity is fully filled, and then solidifies, so that the plastic material covers a part of the thermally sensitive material plate 110U in the mold to form the connecting member 120U on the thermally sensitive material plate 110U. After the plastic is cooled, the mold is opened and the thermally sensitive material plate 110U is taken out, and the connecting member 120U is integrally formed with the thermally sensitive material plate 110U.

Figure 8B:
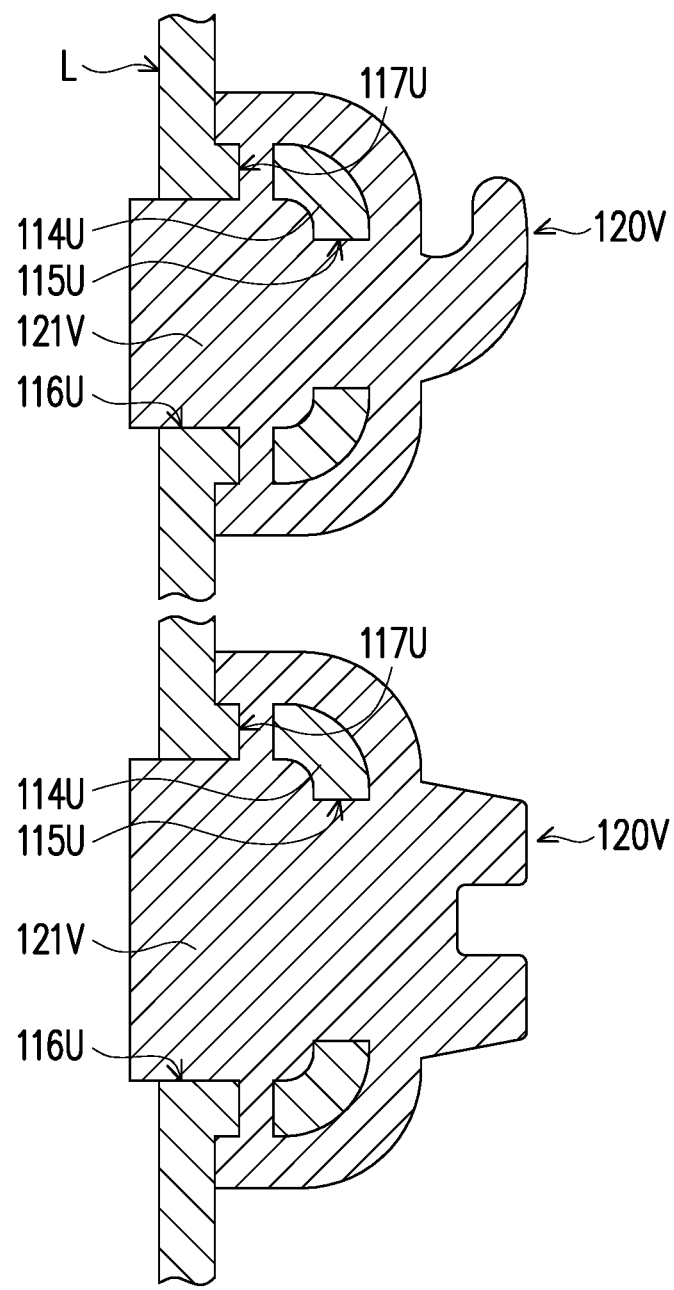

Referring to FIG. 8B, the base plate 100V is slightly different from the base plate 100U of FIG. 8A, and the difference is that the bottom portion of the junction part 121V protrudes from the second surface L to improve the stability of the connecting member 120V.

Figure 8C:
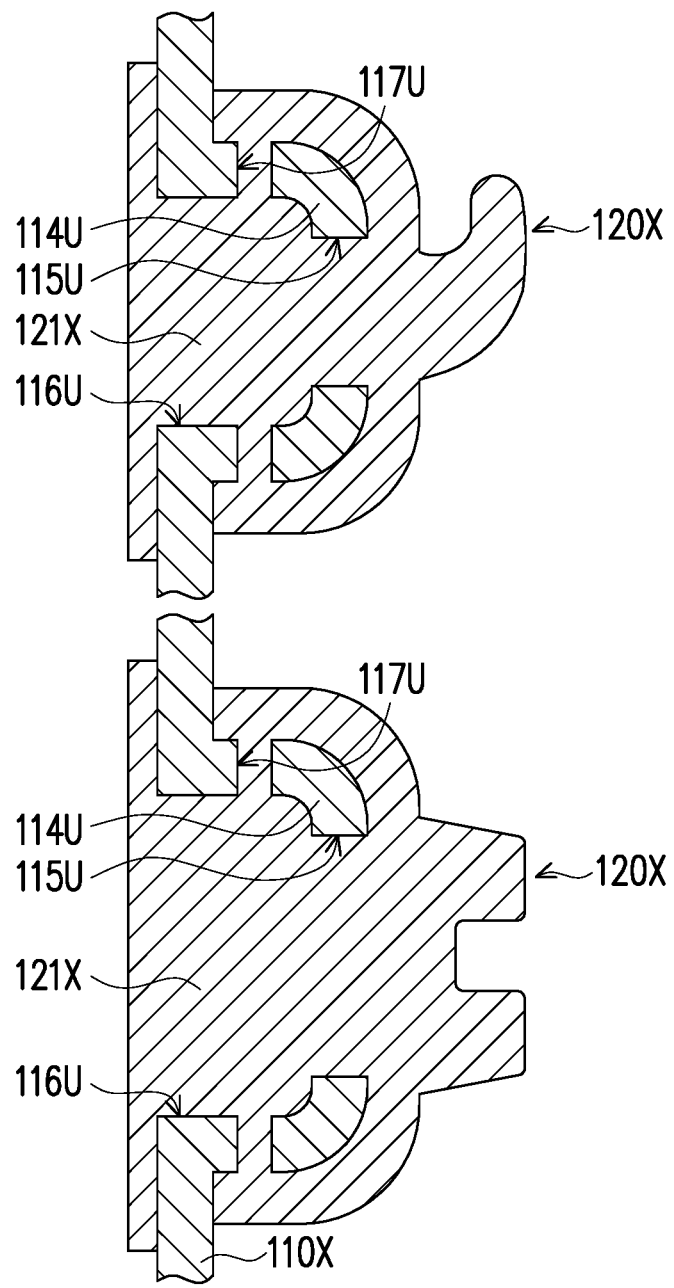

Referring to FIG. 8C, the base plate 100X is slightly different from the base plate 100U of FIG. 8A, and the difference is that the bottom portion of the junction part 121X protrudes from the second surface L and extends along the second surface L beyond the width of the recess 116U so as to firmly join the junction part 121X to the thermally sensitive material plate 110X, thereby improving the stability of the connecting member 120X.

To sum up, the base plate of the disclosure includes a thermally sensitive material plate and a connecting member. In an embodiment, the connecting member and the thermally sensitive material plate may be made of the same material and integrally formed. In another embodiment, the material of the connecting member may be different from the material of the thermally sensitive material plate, and the connecting member and the thermally sensitive material plate may be integrally formed by injection molding to further improve the structural strength of the base plate. With the design of the thermally sensitive material plate, the disclosure reduces not only thickness but also weight. Therefore, when the base plate is applied to an electronic device, the overall weight of the electronic device is reduced without compromising the structural strength of the base plate so as to meet the demand for thinner and lighter electronic devices.

It should be noted that the above embodiments are exemplary and are not intended to limit the disclosure. Although the disclosure has been described in detail with reference to the foregoing embodiments, it will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A base plate adapted for disposing a support unit, the base plate comprising:
   a thermally sensitive material plate; and
   a connecting member comprising a junction part joined to the thermally sensitive material plate, and a connection part extending from the junction part, wherein the connection part protrudes from a surface of the thermally sensitive material plate, wherein the thermally sensitive material plate comprises a first surface and a second surface opposite to the first surface, the connection part protrudes from the first surface and/or the second surface of the thermally sensitive material plate for connecting the support unit, wherein a material of the connecting member is different from a material of the thermally sensitive material plate, and the thermally sensitive material plate further comprises a junction region, the junction part of the connecting member is joined to the junction region, wherein the thermally sensitive material plate comprises a through hole penetrating the first surface and the second surface, and the junction part is filled in the through hole, wherein a bottom of the junction part protrudes from the second surface and partly extends along the second surface.

2. The base plate according to claim 1, wherein the thermally sensitive material plate may be a thermoplastic fiber composite material plate, or a remodelable thermosetting plate material.

3. The base plate according to claim 1, wherein the junction region is surface-processed or surface-treated, and the junction part is bonded to the junction region.

4. The base plate according to claim 1, wherein the thermally sensitive material plate comprises a recess part recessed on the first surface or the second surface, and the junction part is filled in the recess part.

5. The base plate according to claim 3, wherein the junction region comprises a recess part recessed on the first surface or the second surface, and the junction part is filled in the recess part.

6. The base plate according to claim 4, wherein the through hole communicating with the recess part to form a stepped through hole penetrating the first surface and the second surface, and the junction part is filled in the stepped through hole.

7. The base plate according to claim 6, wherein the stepped through hole of the thermally sensitive material plate comprises a first portion and a second portion, a hole diameter of the first portion or the second portion is larger than a hole diameter of the second portion or the first portion, and the junction part is filled in the stepped through hole.

8. A base plate adapted for disposing a support unit, the base plate comprising:
   a thermally sensitive material plate; and
   a connecting member comprising a junction part joined to the thermally sensitive material plate, and a connection part extending from the junction part, wherein the connection part protrudes from a surface of the thermally sensitive material plate, wherein the thermally sensitive material plate comprises a first surface and a second surface opposite to the first surface, the connection part protrudes from the first surface and/or the second surface of the thermally sensitive material plate for connecting the support unit, wherein a material of the connecting member is different from a material of the thermally sensitive material plate, and the thermally sensitive material plate comprises a junction region, the junction part of the connecting member is joined to the junction region, wherein the thermally sensitive material plate comprises a recess part recessed on the first surface or the second surface, wherein the thermally sensitive material plate comprises a through hole communicating with the recess part to form a stepped through hole penetrating the first surface and the second surface, and the junction part is filled in the stepped through hole, wherein a bottom of the junction part protrudes from the second surface and partly extends along the second surface.

9. The base plate according to claim 8, wherein the thermally sensitive material plate may be a thermoplastic fiber composite material plate, or a remodelable thermosetting plate material.

10. The base plate according to claim 8, wherein the junction region is surface-processed or surface-treated, and the junction part is bonded to the junction region.

11. The base plate according to claim 10, wherein the junction region comprises the recess part recessed on the first surface or the second surface.

12. The base plate according to claim 8, wherein the stepped through hole of the thermally sensitive material plate comprises a first portion and a second portion, a hole diameter of the first portion or the second portion is larger than a hole diameter of the second portion or the first portion, and the junction part is filled in the stepped through hole.

13. The button support plate according to claim 1, wherein the material of the connecting member is plastic and is integrally formed with the thermally sensitive material plate by injection molding.

14. The base plate according to claim 1, wherein the thermally sensitive material plate comprises a protrusion structure protruding from the first surface or the second surface around the through hole.

15. The base plate according to claim 14, wherein the protrusion structure is formed a recess recessed on the second surface, the recess communicates with the through hole, and the junction part is filled in the through hole and the recess.

16. The base plate according to claim 1, wherein the thermally sensitive material plate comprises at least one slot located around the through hole, the at least one slot penetrates the first surface and the second surface, and the junction part is filled in the through hole and the at least one slot.

17. The base plate according to claim 6, wherein the thermally sensitive material plate comprises at least one slot located around the stepped through hole, the at least one slot penetrates the first surface and the second surface, and the junction part is filled in the stepped through hole and the at least one slot.

18. The base plate according to claim 14, wherein the thermally sensitive material plate comprises at least one slot located around the protrusion structure, the at least one slot penetrates the first surface and the second surface, and the junction part is filled in the through hole and the at least one slot.

19. The base plate according to claim 14, wherein the protrusion structure comprises at least one slot, the at least one slot communicates with the through hole, and the junction part passes through and is filled in the through hole and the at least one slot, thereby covering the protrusion structure.

20. A key assembly, comprising:
the base plate according to claim 1;
a keycap disposed on the base plate; and
the support unit disposed between the keycap and the base plate, wherein a bottom end of the support unit is pivotally connected to the connecting member of the base plate.

21. An illuminated key input device, comprising:
a key assembly, comprising:
the base plate according to claim 1, wherein the base plate comprises a hollow region; and
a backlight module disposed under the base plate.

22. The illuminated key input device according to claim 21, wherein the backlight module comprising:
a reflective layer;
a light-guiding layer disposed on the reflective layer;
a light emitting unit located beside the light-guiding layer; and
a light-shielding layer disposed on the light-guiding layer and comprising a transparent region, wherein light emitted by the light emitting unit is adapted to enter the light-guiding layer, pass through the transparent region of the light-shielding layer, and then exit through the hollow region of the base plate.

23. The illuminated key input device according to claim 22, wherein the light-shielding layer comprises a hole corresponding to a bottom portion of the connecting member, and the bottom portion of the connecting member is housed in the hole.

24. The illuminated key input device according to claim 22, wherein a bottom of the connecting member abuts an upper surface of the light-shielding layer.

* * * * *